(12) United States Patent
Lee et al.

(10) Patent No.: US 10,293,705 B2
(45) Date of Patent: May 21, 2019

(54) VEHICLE HAVING A DC-DC CONVERTER, AND A METHOD OF CONTROLLING THE DC-DC CONVERTER FOR A VEHICLE

(71) Applicant: HYUNDAI MOTOR COMPANY, Seoul (KR)

(72) Inventors: Dae Woo Lee, Incheon (KR); Woo Young Lee, Yongin-si (KR); Jun Ho Kim, Seongnam-si (KR); Taejong Ha, Seoul (KR); JaeEun Cha, Gwangmyeong-si (KR); Jin Myeong Yang, Busan (KR); Inyong Yeo, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 269 days.

(21) Appl. No.: 15/463,034

(22) Filed: Mar. 20, 2017

(65) Prior Publication Data
US 2018/0141457 A1    May 24, 2018

(30) Foreign Application Priority Data
Nov. 22, 2016  (KR) ........................ 10-2016-0155709

(51) Int. Cl.
| | | |
|---|---|---|
| *B60L 1/00* | (2006.01) | |
| *B60L 3/00* | (2019.01) | |
| *H02G 3/00* | (2006.01) | |
| *B60L 11/18* | (2006.01) | |
| *H02M 1/088* | (2006.01) | |
| *H02M 3/335* | (2006.01) | |
| *B60L 50/15* | (2019.01) | |
| *B60L 50/16* | (2019.01) | |

(Continued)

(52) U.S. Cl.
CPC ........... *B60L 11/1868* (2013.01); *B60L 50/15* (2019.02); *B60L 50/16* (2019.02); *B60L 53/20* (2019.02); *B60L 58/20* (2019.02); *H02M 1/088* (2013.01); *H02M 3/33523* (2013.01); *H02M 3/33546* (2013.01); *B60L 2210/10* (2013.01); *H02M 3/33569* (2013.01); *H02M 2001/0009* (2013.01)

(58) Field of Classification Search
CPC ...... B60L 11/1868; B60L 53/20; B60L 50/15; B60L 50/16; B60L 58/20; B60L 2210/10; H02M 1/088; H02M 3/33523; H02M 3/33546; H02M 3/33569; H02M 2001/0009
See application file for complete search history.

(56) References Cited

U.S. PATENT DOCUMENTS

2010/0213902 A1* 8/2010 Oliveira ............... B60L 11/1811
320/145

* cited by examiner

*Primary Examiner* — Carlos Amaya
(74) *Attorney, Agent, or Firm* — Brinks Gilson & Lione

(57) ABSTRACT

A vehicle may include a first battery to output power of a first voltage, a second battery to output power of a second voltage, a DC-DC converter to convert the first voltage of the first battery into the second voltage, and to supply the power of the second voltage to the second battery. The DC-DC converter may include a transformer to convert the first voltage into the second voltage, a first switch to control first current input to the transformer from the first battery, a current sensor to measure a value of second current output to the second battery from the transformer, and a controller to turn on/off the first switch based on a set turning-on/off frequency. The controller may delay turning-on/off of the first switch based on the measured value of the second current.

23 Claims, 25 Drawing Sheets

(51) Int. Cl.
  *B60L 53/20* (2019.01)
  *B60L 58/20* (2019.01)
  *H02M 1/00* (2006.01)

FIG. 15

| $I_2/I_{2max}$ $V_1/V_{1max}$ | 1 | 0.8 | 0.6 | 0.4 | 0.2 | 0 |
|---|---|---|---|---|---|---|
| 1 | $T_{min}$ | $0.8T_{min}+0.2T_{max}$ | $0.6T_{min}+0.4T_{max}$ | $0.4T_{min}+0.6T_{max}$ | $0.2T_{min}+0.8T_{max}$ | $T_{max}$ |
| 0.8 | $T_{min}$ | $T_{min}$ | $0.75T_{min}+0.25T_{max}$ | $0.5T_{min}+0.5T_{max}$ | $0.25T_{min}+0.75T_{max}$ | $T_{max}$ |
| 0.6 | $T_{min}$ | $T_{min}$ | $T_{min}$ | $0.67T_{min}+0.33T_{max}$ | $0.33T_{min}+0.67T_{max}$ | $T_{max}$ |
| 0.4 | $T_{min}$ | $T_{min}$ | $T_{min}$ | $T_{min}$ | $0.5T_{min}+0.5T_{max}$ | $T_{max}$ |
| 0.2 | $T_{min}$ | $T_{min}$ | $T_{min}$ | $T_{min}$ | $T_{min}$ | $T_{max}$ |

VEHICLE HAVING A DC-DC CONVERTER, AND A METHOD OF CONTROLLING THE DC-DC CONVERTER FOR A VEHICLE

CROSS-REFERENCE TO RELATED APPLICATION

This application claims priority to and the benefit of Korean Patent Application No. 10-2016-0155709, filed on Nov. 22, 2016, which is incorporated herein by reference in its entirety.

FIELD

The present disclosure relates to a vehicle having a direct current to direct current converter (DC-DC converter), and a method of controlling the DC-DC converter for a vehicle.

BACKGROUND

The statements in this section merely provide background information related to the present disclosure and may not constitute prior art.

In general, a vehicle is transportation means that travels on roads or rails using fossil fuel, electricity, etc. as a power source.

A vehicle using fossil fuel emits fine dust, water vapor, carbon dioxides, carbon monoxides, hydrocarbon, nitrogen, nitrogen oxides, and/or sulfur oxides, etc. by burning the fossil fuel. The water vapor and carbon dioxides are known as the cause of global warming, and the carbon monoxides, hydrocarbon, nitrogen, nitrogen oxides, and/or sulfur oxides are known as air pollution materials that can harm humans.

For this reason, recently, vehicles using eco-friendly energy capable of replacing fossil fuel are being developed. For example, a Hybrid Electric Vehicle (HEV) using both fossil fuel and electricity and an Electric Vehicle (EV) using only electricity are being developed.

The HEV and EV include a high-voltage battery to supply power to a motor for moving the vehicle and a low-voltage battery to supply power to electric components of the vehicle. Also, generally, the HEV and EV include a converter to convert a voltage of the high-voltage battery into a voltage of the low-voltage battery in order to supply power from the high-voltage battery to the low-voltage battery.

SUMMARY

The present disclosure provides a vehicle including a DC-DC converter capable of reducing switching loss, the DC-DC converter for a vehicle, and a method of controlling the DC-DC converter for the vehicle.

In one aspect of the present disclosure, a vehicle may include a first battery configured to output power of a first voltage, a second battery configured to output power of a second voltage, a DC-DC converter configured to convert the first voltage of the first battery into the second voltage, and configured to supply the power of the second voltage to the second battery. The DC-DC converter may include a transformer configured to convert the first voltage into the second voltage, a first switch configured to control first current input to the transformer from the first battery, a current sensor configured to measure a value of second current output to the second battery from the transformer, and a controller configured to turn on/off the first switch based on a set turning-on/off frequency. The controller may delay turning-on/off of the first switch based on the measured value of the second current.

The controller may increase a dead time for delaying turning-on of the first switch as the measured value of the second current decreases.

The vehicle may further include a voltage sensor configured to measure a value of the first voltage of the first battery.

The controller may decrease the dead time as the measured value of the first voltage decreases.

The controller may calculate the dead time from the measured value of the first voltage and the measured value of the second current.

The controller may acquire a dead time corresponding to the measured value of the first voltage and the measured value of the second current, from a lookup table including a plurality of values for the first voltage, a plurality of values for the second current, and a plurality of dead times corresponding to the plurality of values for the first voltage and the plurality of values for the second current.

The DC-DC converter may further include a reset capacitor configured to reset a primary coil of the transformer and a second switch configured to control reset current of the reset capacitor. The controller may turn on the second switch after the first switch is turned off, and turn on the second switch after the second switch is turned off The controller may turn on the first switch if a dead time elapses after the second switch is turned off.

The controller may increase the dead time as the measured value of the second current decreases.

A voltage of both terminals of the first switch may be changed by a resonance phenomenon caused by leakage inductance of the transformer and parasitic capacitance of the first switch, and the controller may turn on the first switch when the voltage of the both terminals of the first switch becomes a minimum value by the resonance phenomenon.

The DC-DC converter may further include a rectifier circuit configured to rectify a voltage and current that are output from the transformer.

In one aspect of the present disclosure, a DC-DC converter, which converts a first voltage output from a first battery into a second voltage output from a second battery, may include a transformer including a primary coil connected to the first battery and a secondary coil connected to the second battery and configured to convert the first voltage into the second voltage, a first switch connected in series to the transformer, a reset capacitor connected in parallel to the primary coil, a second switch connected in series to the reset capacitor, a voltage sensor configured to measure a value of the first voltage, a current sensor configured to measure a value of second current output from the secondary coil, and a controller configured to turn on/off the first switch and the second switch, alternately based on an operating frequency. The controller may delay turning-on of the first switch based on the measured value of the first voltage and the measured value of the second current.

The controller may turn on the first switch if a dead time elapses after the second switch is turned off.

The controller may increase the dead time as the measured value of the second current decreases.

The controller may decrease the dead time as the measured value of the first voltage decreases.

The controller may calculate the dead time from the measured value of the first voltage and the measured value of the second current.

The controller may acquire a dead time corresponding to the measured value of the first voltage and the measured value of the second voltage, from a lookup table including a plurality of values for the first voltage, a plurality of values for the second current, and a plurality of dead times corresponding to the plurality of values for the first voltage and the plurality of values for the second voltage.

The DC-DC converter may further include a rectifier circuit configured to rectify a voltage and current that are output from the transformer.

In one form of the present disclosure, a method controlling a DC-DC converter, which include a transformer configured to convert a first voltage of a first battery into a second voltage of a second battery, a first switch configured to control first current input to the transformer, a reset capacitor configured to reset a primary coil of the transformer and a second switch configured to control reset current of the reset capacitor, may include: turning on the second switch to reset the primary coil of the transformer, turning off the second switch, measuring a value of second current output from a secondary coil of the transformer, measuring a value of the first voltage of the first battery, deciding a dead time for delaying turning-on of the first switch based on the measured value of the second current and the measured value of the first voltage, turning on the first switch after the dead time elapses, and turning off the first switch.

The dead time may increase as the measured value of the second current decreases.

The dead time may decrease as the measured value of the first voltage decreases.

The deciding of the dead time may include calculating, by a processor, the dead time from the measured value of the first voltage and the measured value of the second current.

The deciding of the dead time may include: storing a lookup table including a plurality of values for the first voltage, a plurality of values for the second current, and a plurality of dead times corresponding to the plurality of values for the first voltage and the plurality of values for the second voltage, in a memory; and acquiring a dead time corresponding to the measured value of the first voltage and the measured value of the second voltage, from the lookup table stored in the memory.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 14:
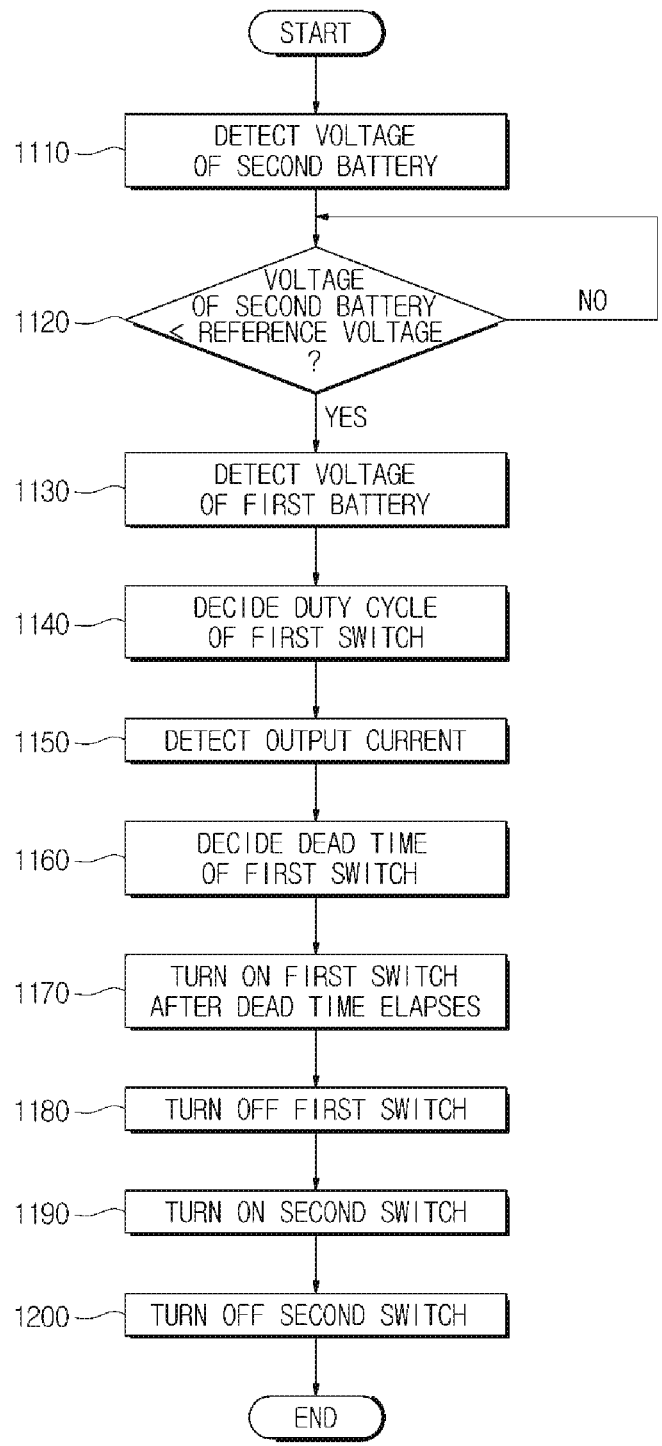
Figure 16A:
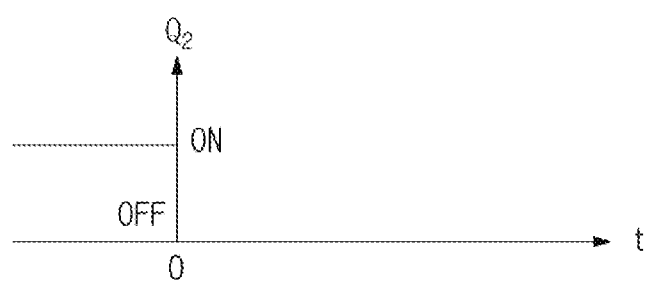
Figure 16B:
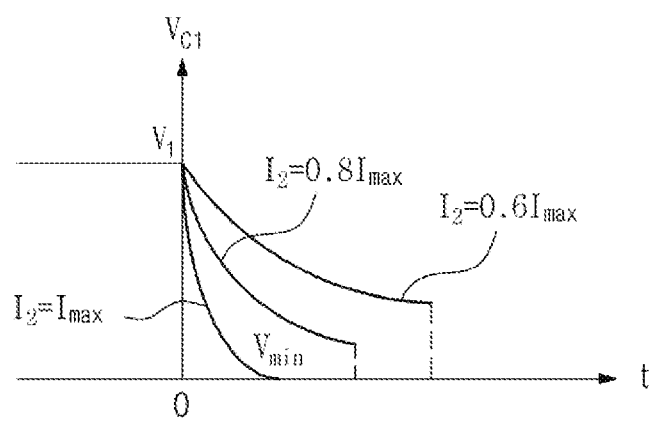
Figure 16C:
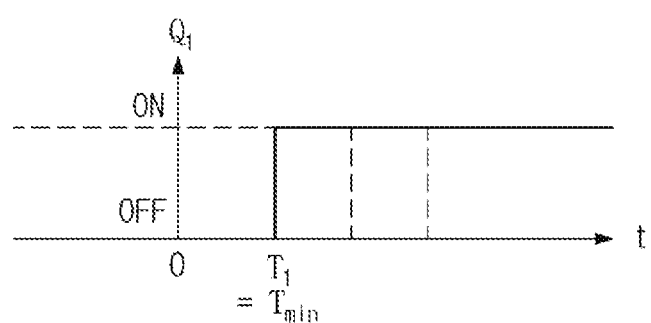
Figure 16D:
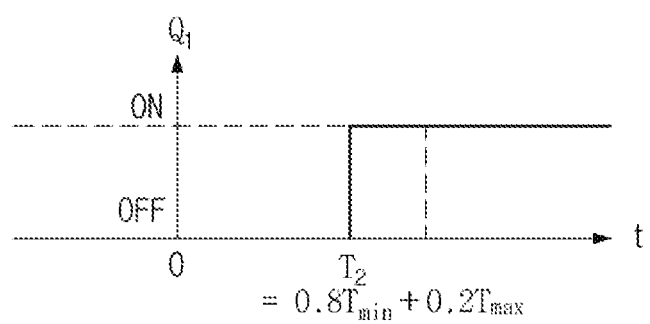
Figure 16E:
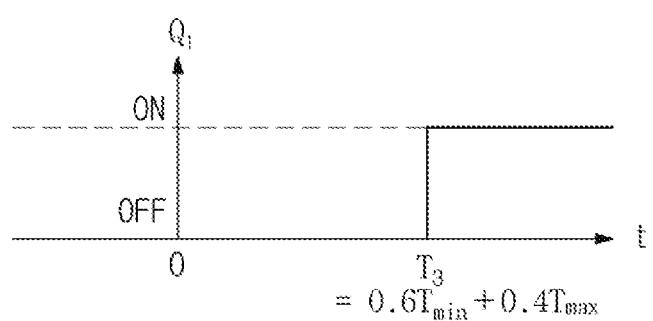
Figure 17:
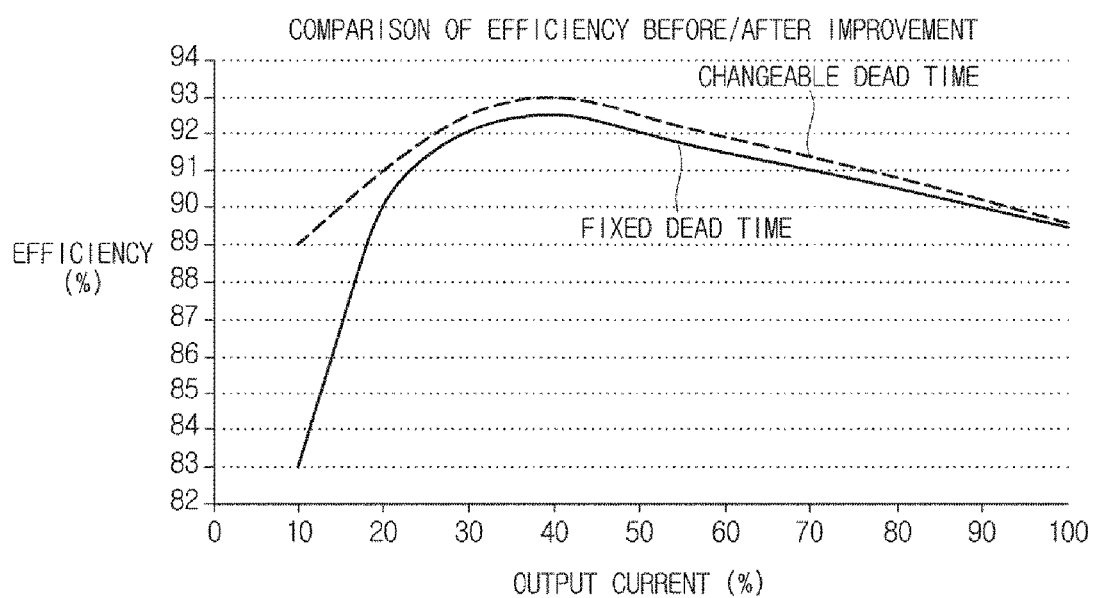

FIGS. 7, 8, 9, 10, and 11 show the flow of current according to the operation of a DC-DC converter;

FIGS. 12A-C and 13A-C are views for describing turning-on of a first switch included in a DC-DC converter;

FIG. 14 is a flowchart illustrating another example of the operation of a DC-DC converter;

FIG. 15 is a lookup table used by a DC-DC converter to decide a dead time of a first switch;

FIGS. 16A-E show changes in turn-on time of a first switch included in a DC-DC converter; and FIG. 17 is a graph illustrating the power conversion efficiency of a DC-DC converter;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary forms may be embodied in many different forms and should not be construed as being limited to the forms set forth herein. These forms are provided so that this disclosure will be thorough and complete and will fully convey the exemplary forms to those of ordinary skill in the art.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular forms only and is not intended to be limiting. As used herein, the singular forms "a," "an," and "the," are intended to include the plural forms as well, unless the context clearly indicates otherwise.

Hereinafter, the operation principle and forms of the present disclosure will be described with reference to the accompanying drawings.

A vehicle is mechanical/electrical equipment to transport humans and/or things using the torque of an internal combustion engine and/or a motor.

A vehicle using an internal combustion engine converts translational energy generated by explosively burning fossil fuel, such as gasoline, diesel, gas, and the like, into rotational energy, and moves using the rotational energy.

A vehicle using a motor, which is called an Electric Vehicle (EV), converts electrical energy stored in a battery into rotational energy, and moves using the rotational energy.

There is a vehicle using both an internal combustion engine and a motor. The vehicle, which is called a Hybrid Electric Vehicle (HEV), can move using the internal combustion engine and the motor. The HEV is classified into a general HEV of generating electrical energy using an internal combustion engine and a motor (a generator) by receiving fossil fuel from the outside, and a Plug-in Hybrid Electric Vehicle (PHEV) of receiving both fossil fuel and electrical energy from the outside.

The EV and the HEV may include a battery for supplying electrical energy to a driving motor, and a battery for supplying electrical energy to electric components of the vehicle. For example, the output voltage of the battery for supplying electrical energy to the driving motor may be about several hundreds of volts (V), and the output voltage of the battery for supplying electrical energy to the electric components may be about several tens of volts (V).

Also, the EV may charge the battery for the driving motor from an external power source, and charge the battery for the electric components by converting the voltage of the battery for the driving motor. The HEV may also charge the battery for the driving motor using the internal combustion engine, and charge the battery for the electric components by converting the voltage of the battery for the driving motor.

Accordingly, the EV and HEV may include a DC-DC converter for converting a voltage of several hundreds of volts output from the battery for the driving motor into a voltage of several tens of volts for charging the battery for the electric components.

Hereinafter, a vehicle and a DC-DC converter included in the vehicle will be described in detail.

Figure 1:
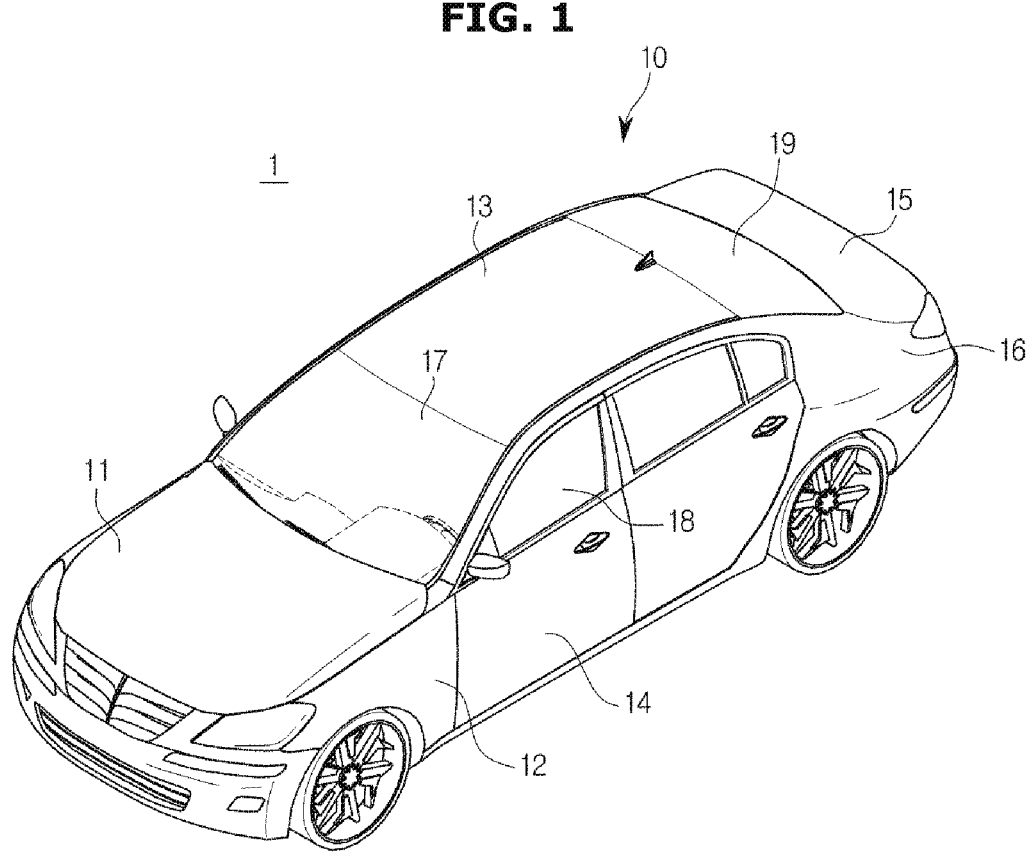
FIG. 1 is a view illustrating the body of a vehicle.
Figure 2:
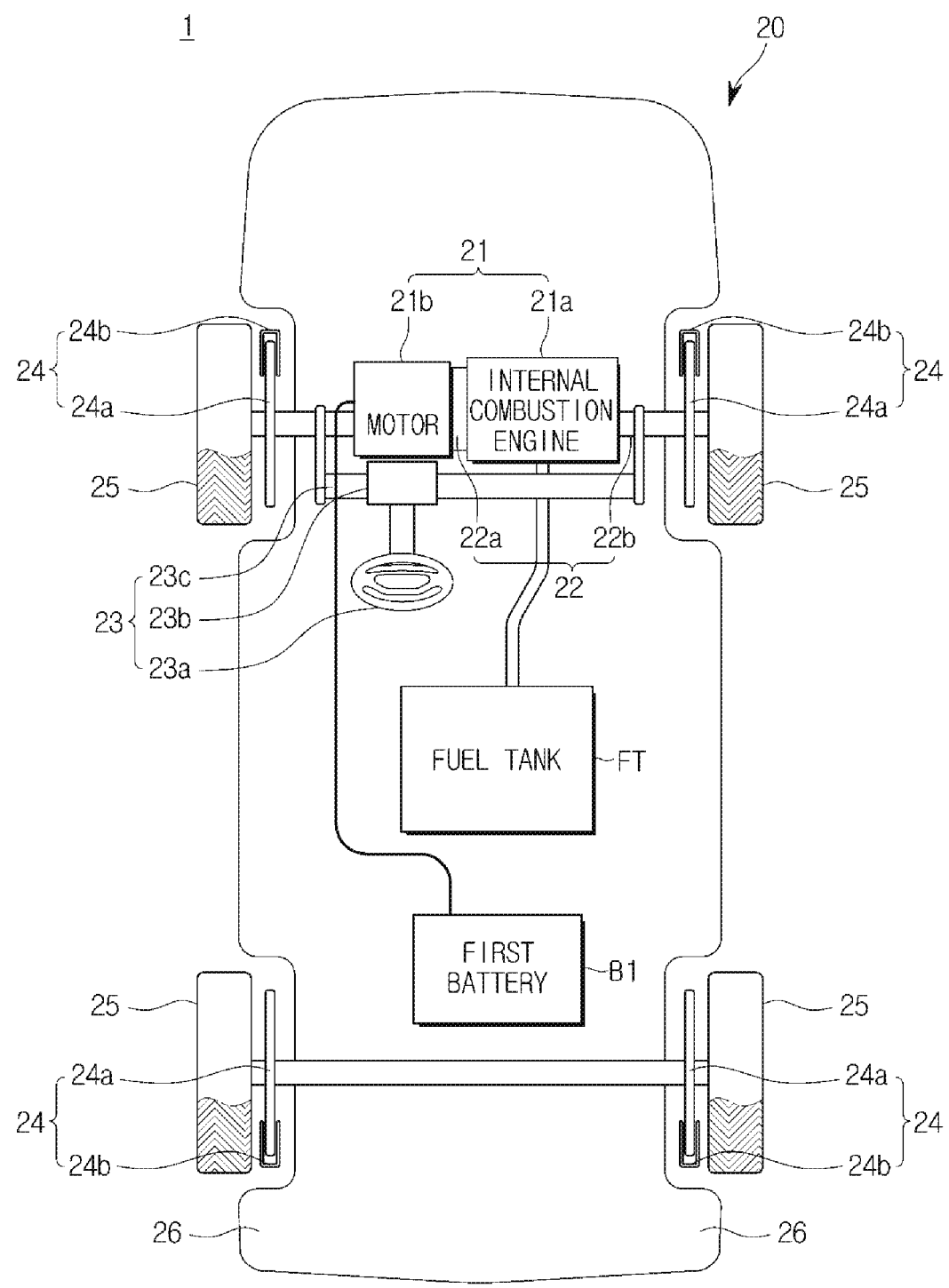
FIG. 2 is a view illustrating the chassis of a vehicle.
Figure 3:
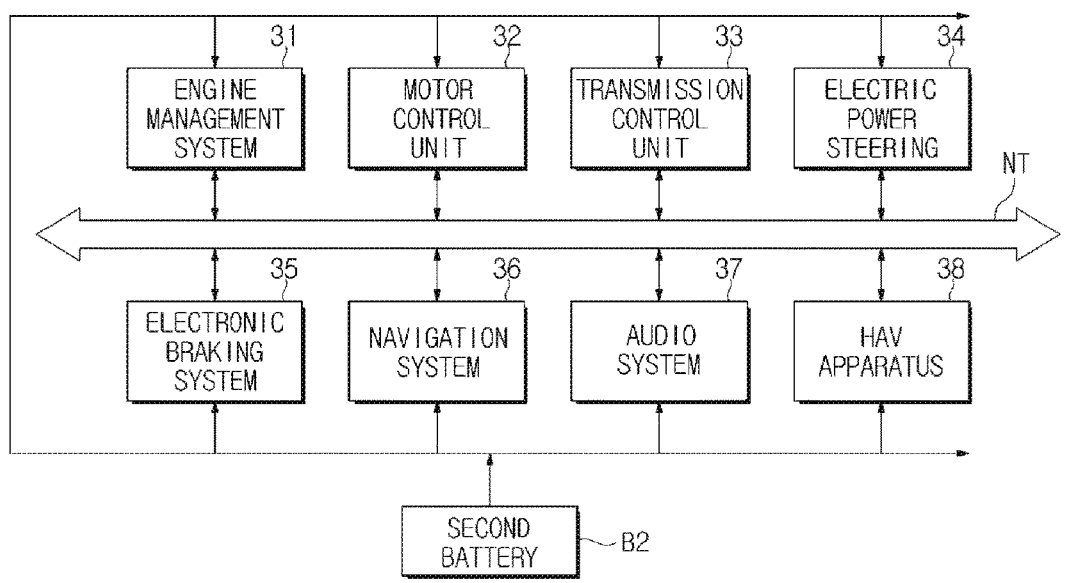
FIG. 3 is a schematic diagram illustrating electric components of a vehicle.
Figure 4:
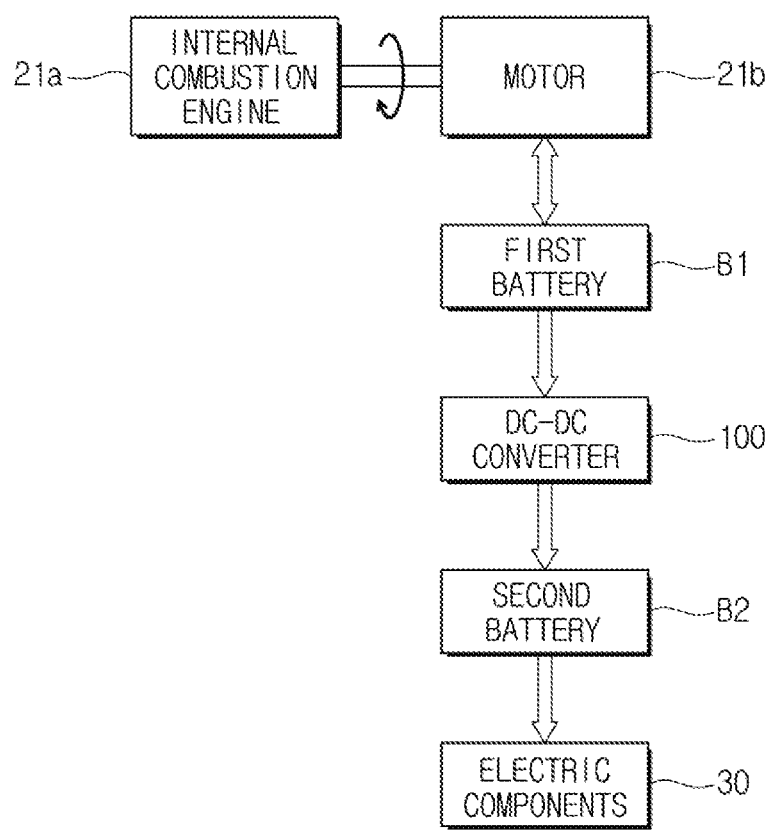
FIG. 4 is a block diagram illustrating the power system of a vehicle.

FIG. 1 shows the body of a vehicle in one form of the present disclosure. FIG. 2 shows the chassis of a vehicle in one form of the present disclosure. FIG. 3 shows the electric components of a vehicle in one form of the present disclosure. Also, FIG. 4 shows the power system of a vehicle in one form of the present disclosure.

Referring to FIGS. 1 to 4, a vehicle 1 may include a body 10 forming the outer appearance of the vehicle 1 and configured to accommodate a driver and/or baggage, a chassis 20 including a power generation system, a power transfer system, a brake system, a steering system, wheels, etc., and a plurality of electric components 30 configured to protect the driver and to provide the driver with convenience.

As shown in FIG. 1, the body 10 may form interior space where the driver can stay, an engine room to accommodate the engine, and a trunk room to accommodate luggage.

The body 10 may include a hood 11, front fenders 12, a roof panel 13, doors 14, a trunk lid 15, and quarter panels 16. Also, in order to provide the driver's visibility, the body 10 may include a front window 17 in the front portion, side windows 18 in the sides, and a rear window 19 in the rear portion.

As shown in FIG. 2, the chassis 20 may include a power generation system 21, a power transfer system 22, a steering system 23, a brake system 24, and wheels 25 so that the vehicle 1 can travel according to the driver's control and/or the control of autonomous driving system. Also, the chassis 20 may further include a frame 26 to fix the power generation system 21, the power transfer system 22, the steering system 23, the brake system 24, and the wheels 25.

The power generation system 21 may generate torque desired for the vehicle 1 to travel, and may include an internal combustion engine 21a, a fuel supply apparatus, an exhaust apparatus, a motor 21b, and a first battery B1.

The power transfer system 22 may transfer torque generated by the power generation system 21 to the wheels 25, and may include a clutch/transmission 22a, a shift lever, a transmission, a differential gear, and a driving shaft 22b.

The steering system 23 may control the driving direction of the vehicle 1, and may include a steering wheel 23a, a steering gear 23b, and a steering link 23c.

The brake system 24 may stop rotation of the wheels 25, and may include a brake pedal, a master cylinder, a brake disc 24a, and a brake pad 24b.

The wheels 25 may receive torque from the power generation system 21 through the power transfer system 22 to move the vehicle 1. The wheels 25 may include front wheels provided in the front portion of the vehicle 1, and rear wheels provided in the rear portion of the vehicle 1.

The vehicle 1 may include various electric components 30 for controlling the vehicle 1 and providing the driver and passengers with safety and convenience, in addition to the above-described mechanical components.

As shown in FIGS. 3 and 4, the vehicle 1 may include an Engine Management System (EMS) 31, a motor control unit 32, a transmission control unit 33, a electric power steering 34, an Electronic Braking System (EBS) 35, a navigation system 36, an audio system 37, and a heating/ventilation/air conditioning (HAV) apparatus 38.

The electric components 30 may communicate with each other through a communication network (CNT) for vehicle. For example, the electric components 30 may transmit/receive data to/from each other through the Ethernet, Media Oriented Systems Transport (MOST), Flexray, Controller Area Network (CAN), Local Interconnect Network (LIN), or the like.

Also, the electric components 30 may receive power from a second battery B2.

The second battery B2 may be separated from a first battery B1 shown in FIG. 2.

For example, as shown in FIG. 4, the first battery B1 may supply power to the motor 21b of driving the vehicle 1, and output a voltage of several hundreds of volts (V) (for example, 200V to 800V) in order to supply power to the motor 21b. Also, the second battery B2 may supply power to the electric components 30, and output a voltage of several tens of volts (V) (for example, 12V to 24V) in order to supply power to the electric components 30. In other words, in order to supply power to the motor 21b and the electric components 30 configured to receive power of different voltages, the first battery B1 may be separated from the second battery B2.

Also, the first battery B1 may supply power to the motor 21b, and may be charged by the motor 21b.

For example, when the vehicle 1 moves down a downhill road, the vehicle 1 may move by gravity and/or inertia, and the rotational force of the wheels 25 may be transferred to the motor 21b through the power transfer apparatus 22. The motor 21b may generate electrical energy from a rotational force transferred from the wheels 25, and the electrical energy generated by the motor 21b may be stored in the first battery B1.

According to another example, when the driver stops the vehicle 1 or decelerates the vehicle 1, the motor 21b may generate a regenerative braking force for decelerating the vehicle 1, and generate electrical energy by regenerative brake. The electrical energy generated by the motor 21b may be stored in the first battery B1.

As such, the first battery B1 may receive electrical energy from the motor 21b, whereas the second battery B2 may receive electrical energy from the first battery B1 through a DC-DC converter 100.

As described above, the voltage of the second battery B2 may be different from that of the first battery B1. Accordingly, in order to charge the second battery B2, the DC-DC converter 100 for converting the voltage of the first battery B1 into the voltage of the second battery B2 may be provided.

The DC-DC converter 100 may convert a first voltage output from the first battery B1 into a second voltage of the second battery B2. The electrical energy of the second voltage converted by the DC-DC converter 100 may be stored in the second battery B2.

Hereinafter, the configuration and operation of the DC-DC converter 100 will be described.

Figure 5:
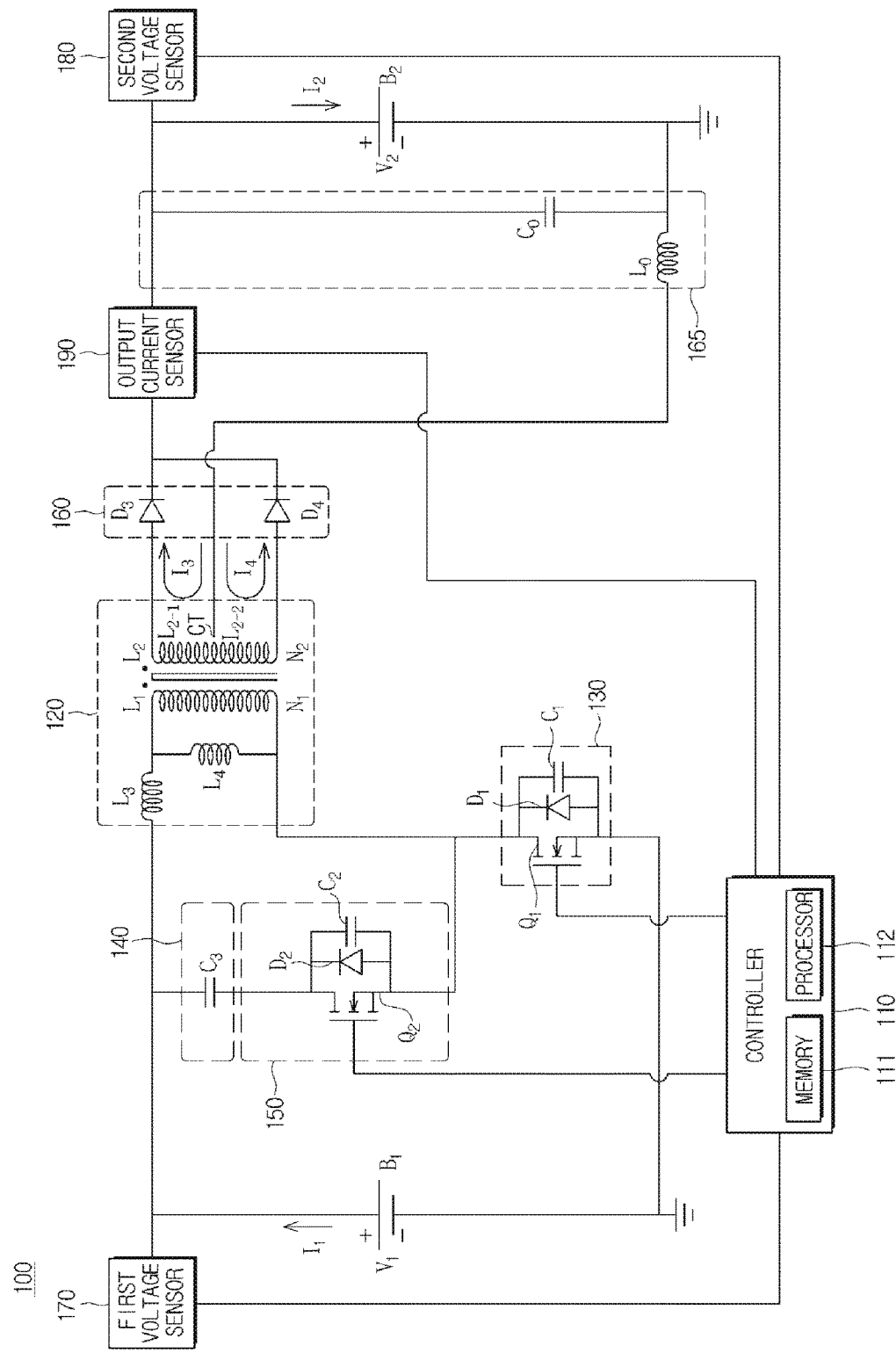
FIG. 5 is a diagram illustrating the configuration of a DC-DC converter.

FIG. 5 shows the configuration of a DC-DC converter according to one form of the present disclosure.

As shown in FIG. 5, the DC-DC converter 100 may be disposed between the first battery B1 of outputting a first voltage $V_1$ and the second battery B2 of outputting a second voltage $V_2$. The DC-DC converter 100 may receive the first voltage $V_1$ and output the second voltage $V_2$.

The DC-DC converter 100 may include a transformer 120, a driving switch circuit 130, a reset circuit 140, a reset switch circuit 150, a rectifier circuit 160, a filter circuit 165, a first voltage sensor 170, a second voltage sensor 180, an output current sensor 190, and a controller 110.

The transformer 120 may change a value of an alternating-current voltage and/or a value of alternating current using electromagnetic induction.

The transformer 120 may include a primary coil $L_1$ of the input side, a secondary coil $L_2$ of the output side, a center tap CT disposed in the center of the secondary coil $L_2$, and a core configured to transfer a magnetic field from the primary coil $L_1$ to the secondary coil $L_2$. A magnetic field changing over time may be formed in the core by an alternating-current voltage and alternating current input to the primary coil $L_1$, and an alternating-current voltage and alternating current may be generated in the secondary coil $L_2$ by the magnetic field of the core.

The secondary coil $L_2$ may be divided into a first coil $L_{2-1}$ and a second coil $L_{2-2}$ by the center tap CT. The center tap CT may be disposed in the center of the secondary coil $L_2$, and the number of turn of the first coil $L_{2-1}$ may be the same as that of the second coil $L_{2-2}$. This type of the transformer 120 is called a center-tap transformer. As such, the transformer 120 including the center tap CT may full-wave rectify an alternating-current voltage and alternating current output from the secondary coil $L_2$, together with the rectifier circuit 160 which will be described later. Full-wave rectification by the first coil $L_{2-1}$ and the second coil $L_{2-2}$ Will be described in more detail, below.

The output voltage that is output from the secondary coil $L_2$ may be calculated by Equation (1), below.

$$V_{out} = \frac{N_2/2}{N_1} V_{in}, \qquad (1)$$

where $V_{out}$ represents the output voltage of the secondary coil $L_2$, $V_{in}$ represents the input voltage of the primary coil $L_1$, $N_2$ represents the number of turn of the secondary coil $L_2$, and $N_1$ represents the number of turn of the primary coil $L_1$.

According to Equation (1), the output voltage Vow of the secondary coil $L_2$ may be proportional to the input voltage $V_{in}$ of the primary coil $L_1$, and a ratio of the number $N_2$ of turn of the secondary coil $L_2$ with respect to the number $N_1$ of turn of the primary coil $L_1$.

An ideal transformer is assumed that input power (a voltage and current) is the same as output power, however, in a real transformer, input power is different from output power due to the loss of a core, etc. The loss of the real transformer can be represented by leakage inductance. Also, for more accurate modeling, the transformer 120 may further include a leakage inductor $L_3$ representing leakage inductance.

The ideal transformer is assumed that the entire of a magnetic field formed by the primary coil $L_1$ is transferred to the secondary coil $L_2$. However, in the real transformer, a part of a magnetic field formed by the primary coil $L_1$ remains in the primary coil $L_1$. A component remained in the primary coil $L_1$ can be represented by magnetizing inductance. Also, for more accurate modeling, the transformer 120 may further include a magnetizing inductor $L_4$ representing magnetizing inductance.

The driving switch circuit 130 may be connected in series to the primary coil $L_1$ of the transformer 120, and control current such that alternating current is input to the primary coil $L_1$ of the transformer 120.

The first battery B1 may output a direct-current voltage and direct current, and the transformer 120 may convert an alternating-current voltage and alternating current. Accordingly, the driving switch circuit 130 may pass or block direct current output from the first battery B1 such that alternating current is input to the transformer 120.

More specifically, the driving switch circuit 130 may repeatedly perform operation of passing current from the first battery B1 toward the transformer 120 and opeartion of blocking current from the first battery B1 toward the transformer 120. In other words, the driving switch circuit 130 may repeatedly perform operation of passing and blocking current at very high velocity (for example, several hundreds of kHz). By the switching operation of the driving switch circuit 130, current changing over time, that is, alternating current may be input to the transformer 120.

The driving switch circuit 130 may include a first switch $Q_1$ to pass or block current according to an input signal, a first freewheeling diode $D_1$ to protect the first switch $Q_1$ from an inverse-direction voltage of the first switch $Q_1$, and a first parasitic capacitor $C_1$ to be parasite on the first switch $Q_1$.

The first switch $Q_1$ may be opened or closed according to a driving signal from the controller 110. If the first switch $Q_1$ is closed (turned on), current may flow from the first battery B1 to the transformer 120, and if the first switch $Q_1$ is opened (turned off), current flowing from the first battery B1 to the transformer 120 may be blocked. If the first switch $Q_1$ is opened or closed repeatedly, alternating current may be supplied to the primary coil $L_1$ of the transformer 120.

The first switch $Q_1$ may be implemented with various structures and materials. For example, the first switch $Q_1$ may adopt a Bipolar Junction Transistor (BJT), a Metal Oxide Semiconductor Field Effect Transistor (MOSFET), an Insulated Gate Bipolar Transistor (IGBT), etc. Also, the first switch $Q_1$ may be formed of a semiconductor material, such as silicon (Si), silicon carbide (SiC), gallium arsenic (GaAs), and the like.

The first freewheeling diode $D_1$ may protect the first switch $Q_1$ from an inverse-direction voltage caused by the inductance of the primary coil $L_1$ of the transformer 120.

The first freewheeling diode $D_1$ may be created by the physical structure of the first switch $Q_1$ or separated from the first switch $Q_1$. The first freewheeling diode $D_1$ may be disposed between both terminals (for example, between the emitter and the collector or between the source and the drain) of the first switch $Q_1$.

Due to the physical structure of the first switch $Q_1$, parasitic capacitance may be formed between both terminals (for example, between the emitter and the collector or between the source and the drain) of the first switch $Q_1$. As such, the first parasitic capacitor $C_1$ may represent the parasitic capacitance of the first switch $Q_1$.

The reset circuit 140 may be connected in parallel to the transformer 120, and emit magnetic energy accumulated in the magnetizing inductor $L_4$ of the transformer 120. As described above, a magnetic field remaining in the primary coil $L_1$ without being transferred to the secondary coil $L_2$ of the transformer 120 may be represented by the magnetizing inductor $L_4$, and the reset circuit 140 may emit magnetic energy (that is, current) stored in the magnetizing inductor $L_4$.

The reset circuit 140 may include a reset capacitor $C_3$ for emitting the magnetic energy stored in the magnetizing inductor $L_4$ of the transformer 120. The magnetizing inductor $L_4$ may generate current by the accumulated magnetizing energy, and the reset capacitor $C_3$ may store current of the magnetizing inductor $L_4$ as electrical energy.

The reset switch circuit 150 may be connected in series to the reset capacitor $C_3$, and the reset switch circuit 150 and the reset capacitor $C_3$ may be connected in parallel to the transformer 120.

The reset switch circuit 150 may control current for emitting the magnetic energy accomulated in the magnetizing inductor $L_4$. In other words, according to the operation of the reset switch circuit 150, magnetic energy stored in the magnetizing inductor $L_4$ of the transformer 120 may be emitted to the reset circuit 140, or may be blocked from being emitted to the reset circuit 140.

The reset switch circuit 150 may include a second switch $Q_2$ for controlling emission of magnetic energy stored in the magnetizing inductor $L_4$, a second freewheeling diode $D_2$, and a second parasitic capacitor $C_2$.

The second switch $Q_2$ may allow or block current emission of the magnetizing inductor $L_4$ by the accumulated magnetic energy. If the second switch $Q_2$ is closed (turned on), current may flow between the magnetizing inductor $L_4$ and the reset capacitor $C_3$, and if the second switch $Q_4$ is opened (turned off), current flowing between the magnetizing inductor $L_4$ and the reset capacitor $C_3$ may be blocked.

The second switch $Q_2$ may be implemented with various structures and materials. For example, the second switch $Q_2$ may adopt a BJT, a MOSFET, an IGBT, etc. Also, the second switch $Q_2$ may be formed of a semiconductor material, such as silicon (Si), silicon carbide (SiC), gallium arsenic (GaAs), and the like.

The rectifier circuit 160 may convert alternating current output from the transformer 120 into direct current.

As described above, the transformer 120 may change a value of an alternating-current voltage and/or a value of alternating current. That is, the transformer 120 may receive an alternating-current voltage and alternating current, change the magnitudes of the alternating-current voltage and the alternating current, and then output the changed alternating-current voltage and alternating current.

The rectifier circuit 160 may convert the alternating-current voltage and the alternating current output from the transformer 120 into a direct-current voltage and direct current.

The rectifier circuit 160 may include a first rectifier diode $D_3$ to rectify the output current of the first coil $L_{2-1}$ in the secondary coil $L_2$ of the transformer 120, and a second rectifier diode $D_4$ to rectify the output current of the second coil $L_{2-2}$.

The current output from the secondary coil $L_2$ of the transformer 120 may change according to the direction of current input to the primary coil $L_1$, and the first rectifier diode $D_3$ and the second rectifier diode $D_4$ may rectify forward current $I_3$ and reverse current $I_4$ output from the first coil $L_{2-1}$ and the second coil $L_{2-2}$ such that the forward current $I_3$ and the reverse current $I_4$ flow to the second battery B2. For example, if forward current $I_3$ is generated in the first coil $L_{2-1}$ and the second coil $L_{2-2}$ by the current of the primary coil $L_1$, the first rectifier diode $D_3$ may allow the forward current $I_3$ of the first coil $L_{2-1}$, and the second rectifier diode $D_4$ may block the forward current $I_3$ of the second coil $L_{2-2}$. Also, if reverse current $I_4$ is generated in the first coil $L_{2-1}$ and the second coil $L_{2-2}$, the first rectifier diode $D_3$ may block the reverse current $I_4$ of the first coil $L_{2-1}$, and the second rectifier diode $D_4$ may allow the reverse current $I_4$ of the second coil $L_{2-2}$.

As a result, the first rectifier diode $D_3$ and the second rectifier diode $D_4$ may rectify alternating current output from the secondary coil $L_2$ of the transformer 120, and output direct current to the second battery B2.

The filter circuit 165 may remove ripples of the voltage rectified by the rectifier circuit 160. The filter circuit 165 may include an output inductor $L_O$ and an output capacitor $C_O$. The output inductor $L_O$ may filter out ripples of the direct current output from the rectifier circuit 160, and the output capacitor $C_O$ may filter out ripples of the direct-current voltage output from the rectifier circuit 160.

The first voltage sensor 170 may measure a first voltage $V_1$ of the first battery B1, that is, a voltage that is input to the DC-DC converter 100. Also, the first voltage sensor 170 may output an electrical signal corresponding to a value of the first voltage $V_1$ to the controller 110.

The first voltage sensor 170 may include a voltage divider to divide the first voltage $V_1$ of the first battery B1, and output a voltage signal divided by the voltage divider to the controller 110.

The first battery B1 may supply electrical energy to the motor 21b, and change an output voltage according to the amount of stored electrical energy. Also, the motor 21b may consume a large amount of electrical energy since it drives the vehicle 1. Accordingly, the electrical energy stored in the first battery B1 may change sharply, and the first voltage $V_1$ of the first battery B1 may also change sharply. For example, the first voltage $V_1$ of the first battery B1 may change in the range of 200V to 800V.

The first voltage sensor 170 may measure the first voltage $V_1$ of the first battery B1, and output the magnitude of the first voltage $V_1$ to the controller 110, so that the DC-DC converter 100 can output a constant magnitude of voltage to the second battery B2 regardless of a change of the first voltage $V_1$ of the first battery B1.

The second voltage sensor 180 may measure the second voltage $V_2$ of the second battery B2, that is, the voltage output from the DC-DC converter 100. Also, the second voltage sensor 180 may output an electrical signal corresponding to the value of the second voltage $V_2$ to the controller 110.

The second voltage sensor 180 may include a voltage divider to divide the second voltage $V_2$ of the second battery B2, and output a voltage signal divided by the voltage divider to the controller 110.

The second battery B2 may supply electrical energy to the electric components 30, and the output voltage of the second battery B2 may change according to the amount of electrical energy stored in the second battery B2. However, in one form, the second voltage $V_2$ of the second battery B2 may be maintained within a predetermined range, in order to stably operate the electric components 30 and inhibit or prevent the electric components 30 from being damaged.

Accordingly, if the second voltage $V_2$ of the second battery B2 is lower than a lower limit of voltage, the DC-DC converter 100 may allow the first battery B1 to supply electrical energy to the second battery B2, and if the second voltage $V_2$ of the second battery B2 is higher than a upper limit of voltage, the DC-DC converter 100 may inhibit or prevent the first battery B1 from supplying electrical energy to the second battery B2.

The second voltage sensor 180 may measure the second voltage $V_2$ of the second battery B2, and output the magnitude of the second voltage $V_2$ to the controller 110 so that the DC-DC converter 100 can maintain the voltage of the second battery B2 constant.

The output current sensor 190 may measure second current $I_2$ which the DC-DC converter 100 outputs to the second battery B2. Also, the output current sensor 190 may output an electrical signal corresponding to a value of the second current $I_2$ to the controller 110.

The output current sensor 190 may include various circuits for measuring the second current $I_2$. For example, the output current sensor 190 may include a hole sensor for measuring the intensity of a magnetic field formed around a wire through which current flows to the second battery B2, and the hole sensor may output an electrical signal corresponding to the measured intensity of the magnetic field. Also, the controller 110 may calculate a value of the second current $I_2$ based on the output of the hole sensor, and control the operation of the driving switch circuit 130 according to the value of the second current $I_2$.

As such, the output current sensor 190 may measure the magnitude of the second current $I_2$ output from the DC-DC converter 100, and output the magnitude of the second current $I_2$ to the controller 110.

The controller 110 may control the operation of the DC-DC converter 100, and include a memory 111 and a processor 112.

The memory 111 may store a control program and control data for controlling the operation of the DC-DC converter 100. Also, the memory 111 may temporarily store the value of the first voltage $V_1$, the value of the second voltage $V_2$, and the value of the second current $I_2$.

Also, the memory 111 may provide the control program and/or control data to the processor 112 according to a memory control signal from the processor 112, or provide the value of the first voltage $V_1$, the value of the second voltage $V_2$, and the value of the second current $I_2$ to the processor 112.

The memory 111 may include volatile memory, such as Static Random Access Memory (S-RAM), Dynamic Random Access Memory (D-RAM), and the like, which can temporarily store data. Also, the memory 111 may include non-volatile memory, such as Read Only Memory (ROM), Erasable Programmable Read Only Memory (EPROM), Electrically Erasable Programmable Read Only Memory (EEPROM), flash memory, and the like, which can store control programs and/or control data for a long time.

The processor 112 may include various logic circuits and arithmetic circuits to process data according to a program provided from the memory 112 and to generate a control signal according to the result of the processing.

For example, the processor 112 may calculate an on-time duty cycle of the first switch $Q_1$ included in the driving switch circuit 130 from the value of the first voltage $V_1$ and the value of the second voltage $V_2$. Also, the processor 112 may calculate a dead time $T_{dead}$ for delaying turning-on of the first switch $Q_1$ from the value of the first voltage $V_1$ and the value of the second current $I_2$. Also, the processor 112 may generate a driving control signal for closing (turning on) or opening (turning off) the first switch $Q_1$ and a reset control signal for opening (turning off) or closing (turning on) the second switch $Q_2$, according to the on-time duty cycle of the first switch $Q_1$ and the dead time $T_{dead}$ of the first switch $Q_1$.

The memory 111 and the processor 112 may be implemented as separate integrated circuits (ICs) or a single integrated circuit (IC).

As such, the controller 110 may control the operations of the driving switch circuit 130 and the reset circuit 140 based on the value of the first voltage $V_1$, the value of the second voltage $V_2$, and the value of the second current $I_2$.

Hereinafter, the operation of the controller 110 will be described in detail, together with the operation of the DC-DC converter 100.

Figure 6:
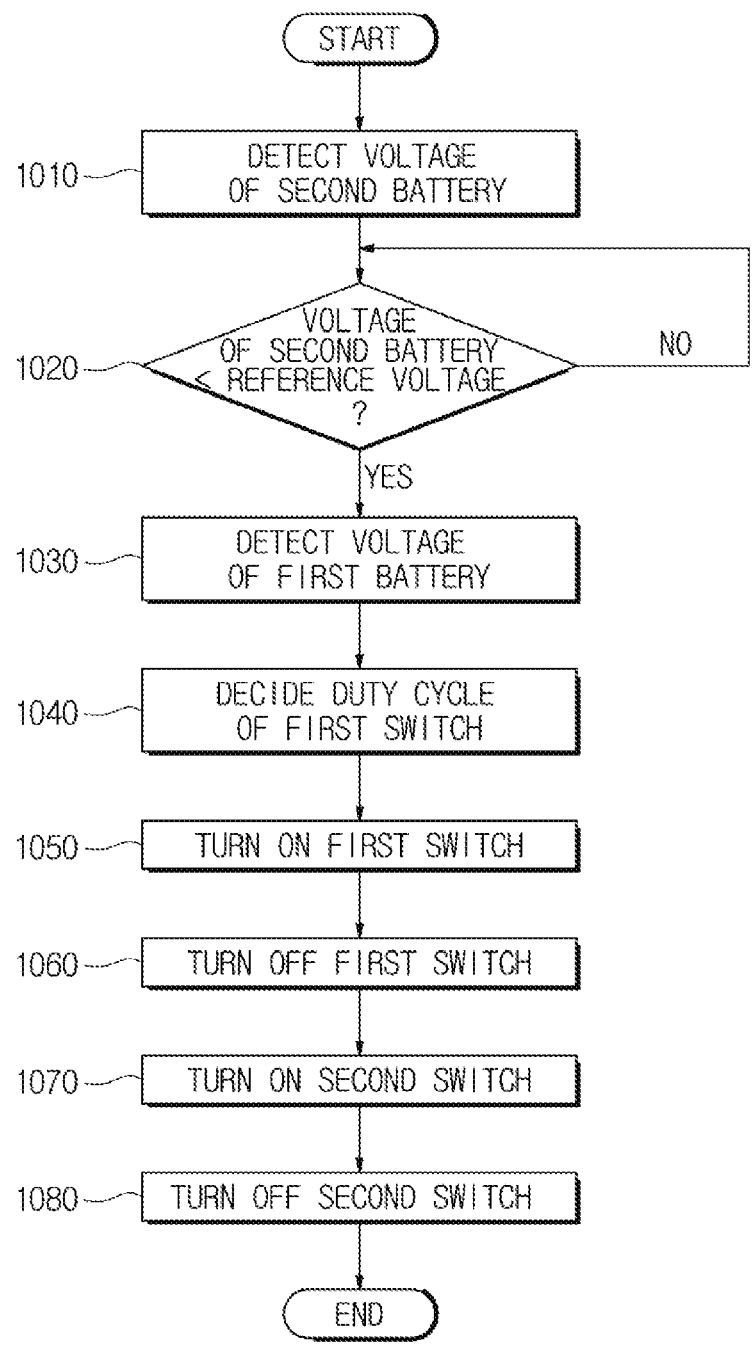
FIG. 6 is a flowchart illustrating an example of the operation of a DC-DC converter.

FIG. 6 is a flowchart illustrating an example of the operation of a DC-DC converter in one form of the present disclosure. FIGS. 7, 8, 9, 10, and 11 show the flow of current according to the operation of a DC-DC converter in one form of the present disclosure. Also, FIGS. 12 and 13 are views for describing turning-on of a first switch included in a DC-DC converter in one form of the present disclosure.

Hereinafter, voltage drop operation 1000 of the DC-DC converter 100 will be described with reference to FIGS. 6 to 13.

The DC-DC converter 100 may perform voltage drop operation 1000 at predetermined time intervals. For example, the DC-DC converter 100 may perform voltage drop operation 1000 according to a turning-on/off cycle of the first switch $Q_1$.

The DC-DC converter 100 may detect a second voltage $V_2$ of the second battery B2, in operation 1010.

The second voltage sensor 180 of the DC-DC converter 100 may measure a value of a second voltage $V_2$ of the second battery B2, and output an electrical signal corresponding to the value of the second voltage $V_2$. Also, the controller 110 may calculate the value of the second voltage $V_2$ from an output signal of the second voltage sensor 180. For example, the second voltage sensor 180 may output an analog signal having a magnitude that is proportional to the value of the second voltage $V_2$, and the controller 110 may convert the analog signal output from the second voltage sensor 180 into digital data using an analog-to-digital converter.

The DC-DC converter 100 may determine whether the second voltage $V_2$ of the second battery B2 is smaller than a reference voltage, in operation 1020.

The controller 110 of the DC-DC converter 100 may compare the second voltage $V_2$ of the second battery B2 to the reference voltage to determine whether the second voltage $V_2$ is smaller than the reference voltage. The reference voltage may be a voltage at which the electric components 30 receiving electrical energy from the second battery B2 can operate normally.

If the controller 110 determines that the second voltage $V_2$ of the second battery B2 is not smaller than the reference voltage ("No" in operation 1020), the DC-DC converter 100 may repeatedly perform operation of detecting the second voltage $V_2$ of the second battery B2.

If the controller 110 determines that the second voltage $V_2$ of the second battery B2 is smaller than the reference voltage ("Yes" in operation 1020), the DC-DC converter 100 may detect the first voltage $V_1$ of the first battery B1, in operation 1030.

The first voltage sensor 170 of the DC-DC converter 100 may measure a value of the first voltage $V_1$ of the first battery B1, and output an electrical signal corresponding to the measured value of the first voltage $V_1$. Also, the controller 110 may calculate the value of the first voltage $V_1$ from an output signal of the first voltage sensor 170. For example, the first voltage sensor 170 may output an analog signal having a magnitude that is proportional to the value of the first voltage $V_1$, and the controller 110 may convert the analog signal output from the first voltage sensor 170 into digital data using an analog-to-digital converter.

The DC-DC converter 100 may decide a duty cycle of the first switch $Q_1$, in operation 1040.

The controller 110 of the DC-DC converter 100 may decide a duty cycle of the first switch $Q_1$, an on time of the first switch $Q_1$, and an on time of the second switch $Q_2$, from the voltage (the first voltage $V_1$) of the first battery B1, the voltage (the second voltage $V_2$) of the second battery B2, and the turning-on/off cycle of the first switch $Q_1$.

An input voltage $V_{in}$ and an output voltage $V_{out}$ of the DC-DC converter 100 may have correlation that can be expressed by Equation (2) below.

$$V_{out} = \frac{N_2/2}{N_1} D V_{in}, \qquad (2)$$

where $V_{out}$ represents the output voltage of the DC-DC converter 100, $V_{in}$ represents the input voltage of the DC-DC converter 100, $N_2$ represents the number of turn of the secondary coil $L_2$, $N_1$ represents the number of turn of the primary coil $L_1$, and D represents the duty cycle of the first switch $Q_1$.

According to Equation (2), the output voltage $V_{out}$ of the DC-DC converter 100 may be proportional to the input voltage $V_{in}$ of the DC-DC converter 100, a ratio of the number $N_2$ of turn of the secondary coil $L_2$ with respect to the number $N_1$ of turn of the primary coil $L_1$, and the duty cycle D of the first switch $Q_1$.

The input voltage $V_{in}$ of the DC-DC converter 100 may be equal to the first voltage $V_1$, and the output voltage $V_{out}$ of the DC-DC converter 100 may be equal to the second voltage $V_2$.

The controller 110 may calculate a duty cycle D of the first switch $Q_1$, from a voltage of the first battery B1, a voltage of the second battery B2, the number $N_1$ of turn of the primary coil $L_1$, and the number $N_2$ of turn of the secondary coil $L_2$, using Equation (2).

Also, the controller 110 may calculate a turning-on/off cycle of the first switch $Q_1$ from a predetermined switching frequency (a turning-on/off frequency, for example, 200 kHz) of the first switch $Q_1$, and calculate an on-time/off-time of the first switch $Q_1$, and an off-time/on-time of the second switch $Q_2$, from the turning-on/off (switching) cycle of the first switch $Q_1$ and the duty cycle D of the first switch $Q_1$.

The controller 110 may calculate the duty cycle D of the first switch $Q_1$ using Equation (2), or decide the duty cycle D of the first switch $Q_1$ with reference to the memory 111. For example, the memory 111 may store a lookup table including a first voltage $V_1$ of the first battery B1, a second voltage $V_2$ of the second battery B2, and a duty cycle D of the first switch $Q_1$ corresponding to the first voltage $V_1$ and the second voltage $V_2$, and the controller 110 may decide the duty cycle D of the first switch $Q_1$ corresponding to the voltage of the first battery B1 and the voltage of the second battery B2 with reference to the lookup table stored in the memory 111.

The DC-DC converter 100 may close (turn on) the first switch $Q_1$, in operation 1050.

The controller 110 of the DC-DC converter 100 may output a turn-on signal to the first switch $Q_1$. The first switch $Q_1$ may be closed (turned on) in response to the turn-on signal of the controller 110.

Figure 7:
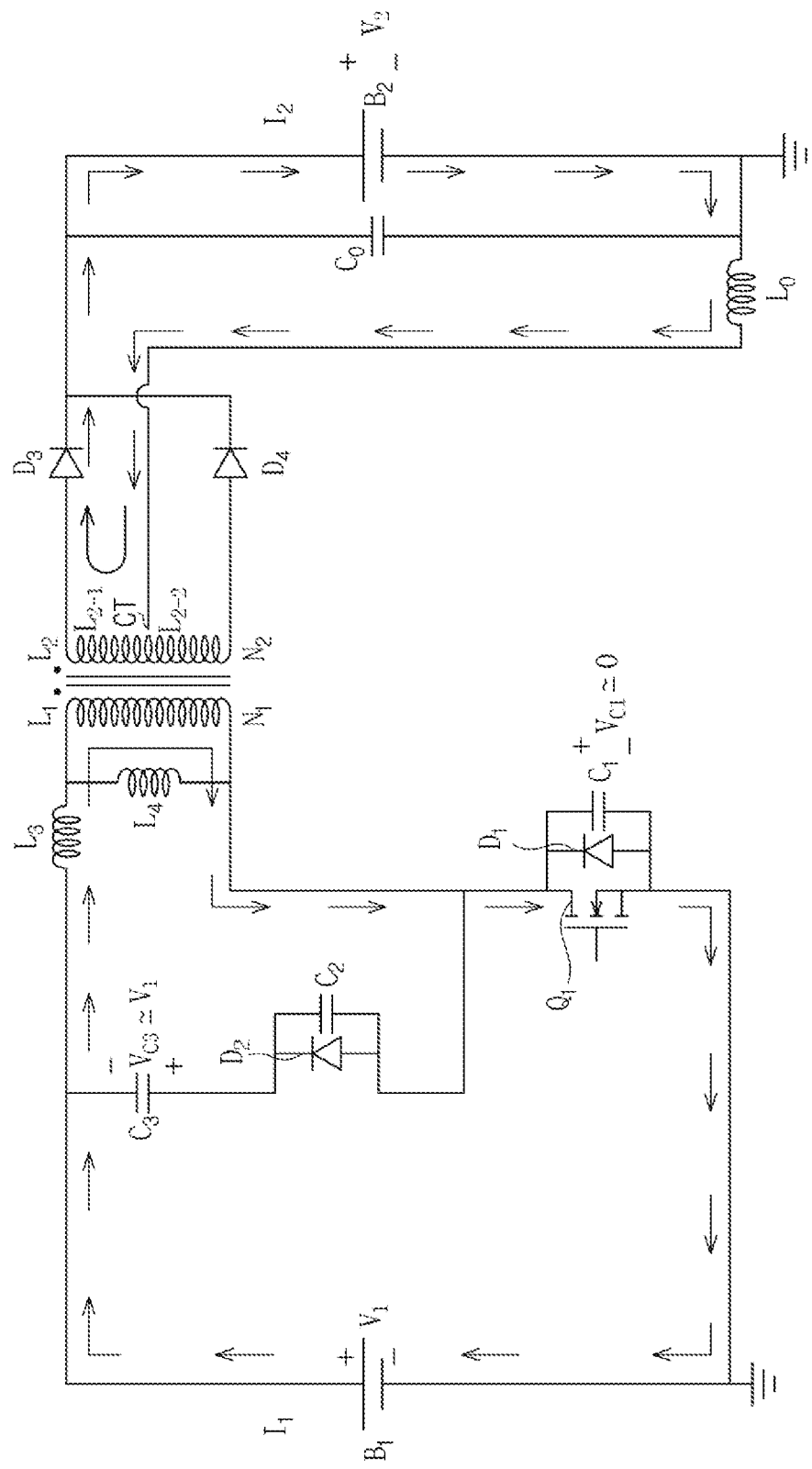

If the first switch $Q_1$ is closed (turned on), a path enabling current to flow from the first battery B1 to the transformer 120 may be created. As a result, as shown in FIG. 7, current $I_1$ of the first battery B1 may flow from the positive pole of the first battery B1 to the negative pole of the first battery B1 via the primary coil $L_1$ of the transformer 120 and the first switch $Q_1$.

Since the first switch $Q_1$ is in the turned-on state, a voltage $V_{C1}$ of the first parasitic capacitor $C_1$ of the first switch $Q_1$ may become about "0V".

Also, due to the current $I_1$ passing through the primary coil $L_1$ of the transformer 120, current $I_2$ may be induced in the secondary coil $L_2$ of the transformer 120, and the current $I_2$ induced by the secondary coil $L_2$ may be supplied to the second battery B2 via the first rectifier diode $D_3$. As a result, the second battery B2 may be charged.

Then, the DC-DC converter 100 may open (turn off) the first switch $Q_1$, in operation 1060.

If the on time of the first switch $Q_1$ elapses after the first switch $Q_1$ is closed (turned on), the controller 110 may output a turn-off signal to the first switch $Q_1$. The first switch $Q_1$ may be opened (turned off) in response to the turn-off signal of the controller 110.

If the first switch $Q_1$ is opened (turned off), the path enabling current to flow from the first battery B1 to the transformer 120 may be blocked. As a result, the current $I_1$ flowing from the first battery B1 to the primary coil $L_1$ of the transformer 120 may be blocked.

Although the current $I_1$ is blocked, magnetic energy stored in the primary coil $L_1$ of the transformer 120 may be emitted through the secondary coil $L_2$. However, the leakage inductor $L_3$ and/or the magnetizing inductor $L_4$ of the transformer 120 may emit no magnetic energy, and the magnetic energy may be stored in the leakage inductor $L_3$ and/or the magnetizing inductor $L_4$.

Figure 8:
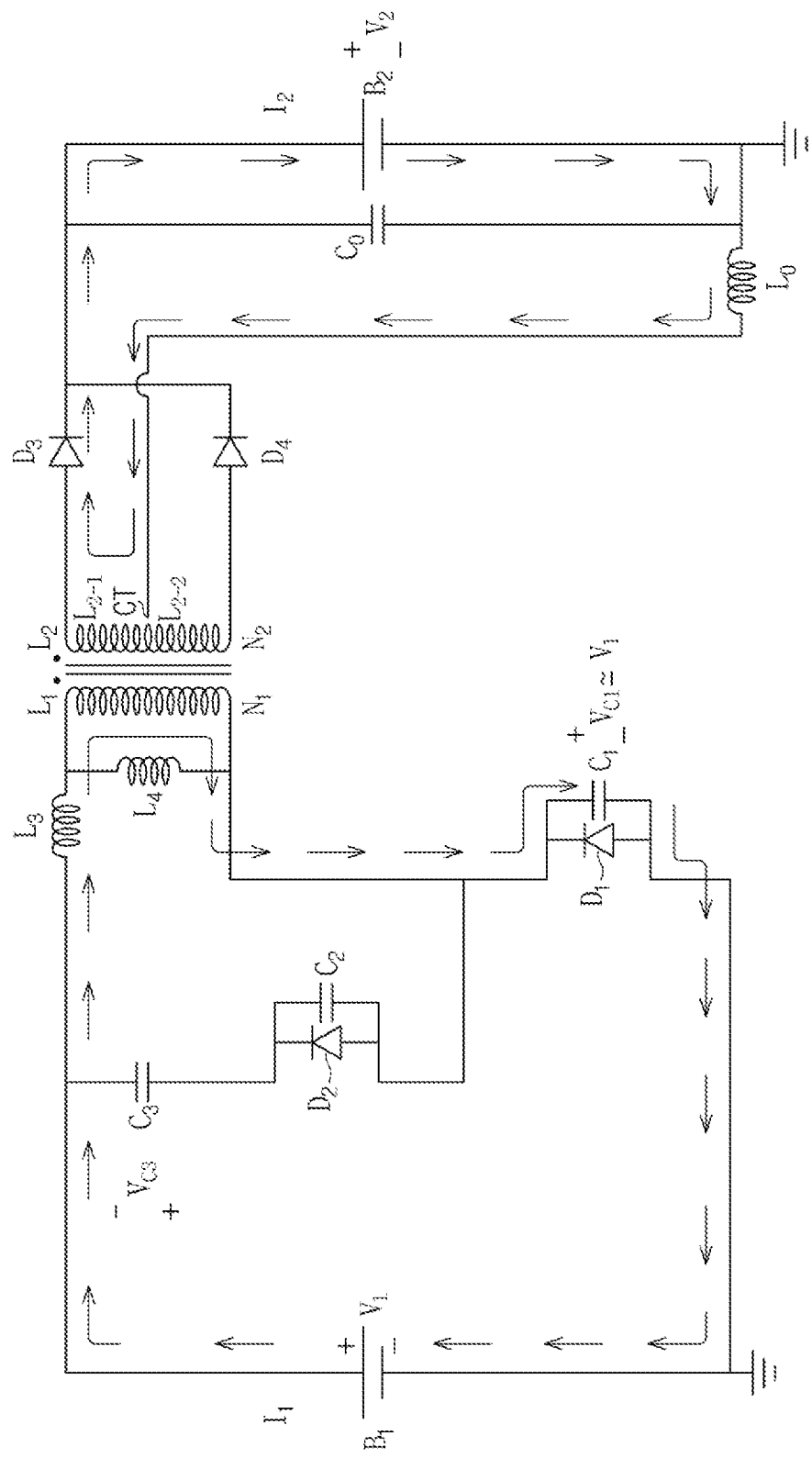

Also, before the current $I_1$ is blocked, the current $I_1$ output from the first battery B1 may charge the first parasitic capacitor $C_1$ of the first switch $Q_1$, as shown in FIG. 8. If the first parasitic capacitor $C_1$ is charged, the voltage $V_{c1}$ of the first parasitic capacitor $C_1$ may become nearly equal to the voltage (that is, the first voltage $V_1$) of the first battery B1.

Successively, the DC-DC converter 100 may close (turn on) the second switch $Q_2$, in operation 1070.

After the first switch $Q_1$ is opened (turned off), the controller 110 may output a turn-on signal to the second switch $Q_2$. The second switch $Q_2$ may be closed (turned on) in response to the turn-on signal of the controller 110.

Figure 9:
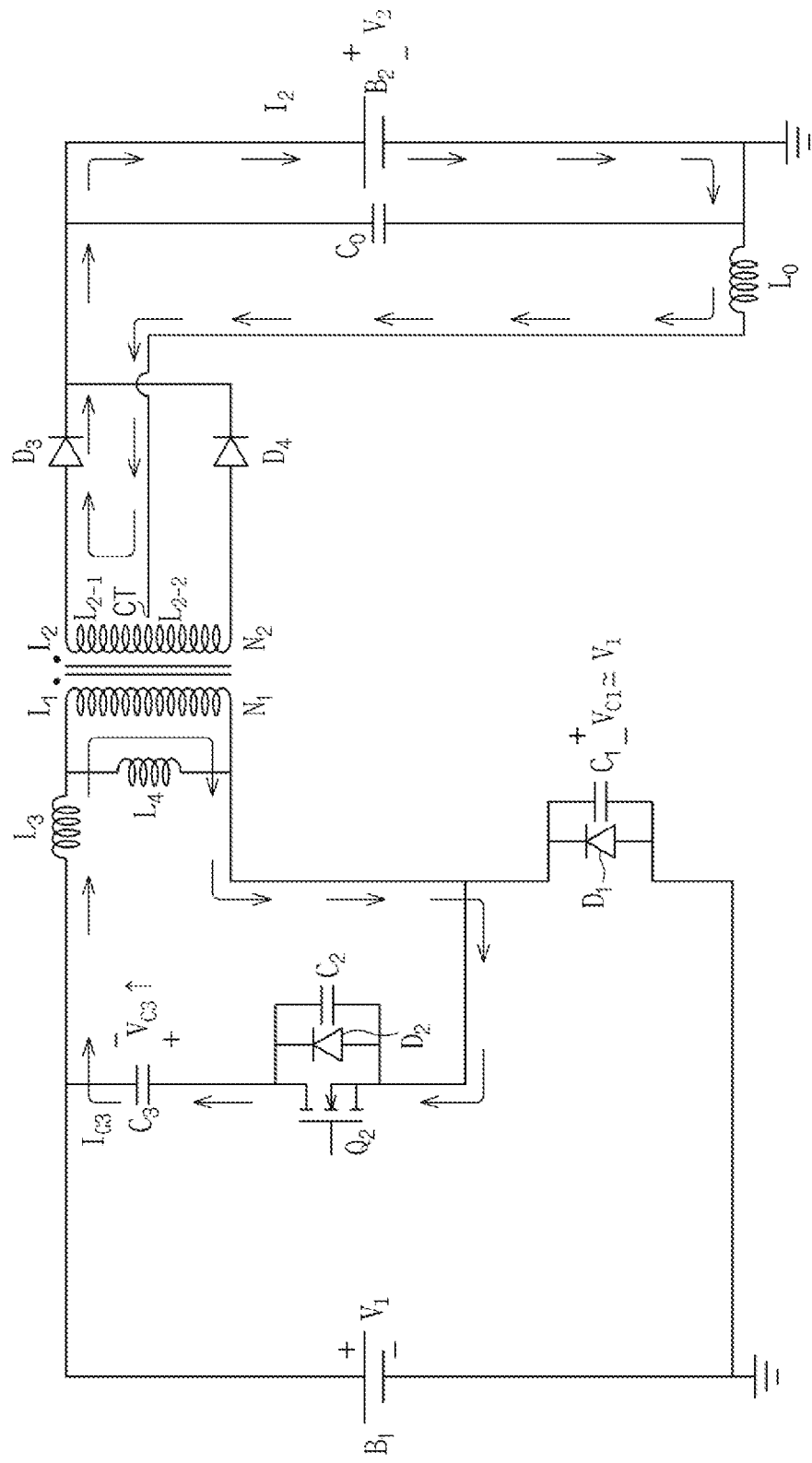

If the second switch $Q_2$ is closed (turned on), a path enabling current to flow between the transformer 120 and the reset circuit 140 may be created. As a result, as shown in FIG. 9, current $I_{C3}$ generated by the magnetic energy stored in the leakage inductor $L_3$ and/or the magnetizing inductor $L_4$ may flow to the reset capacitor $C_3$ via the second switch $Q_2$. Also, the reset capacitor $C_3$ may be charged by the current $I_{C3}$ of the magnetizing inductor $L_4$, so that the voltage $V_{C3}$ of the reset capacitor $C_3$ may rise.

Figure 10:
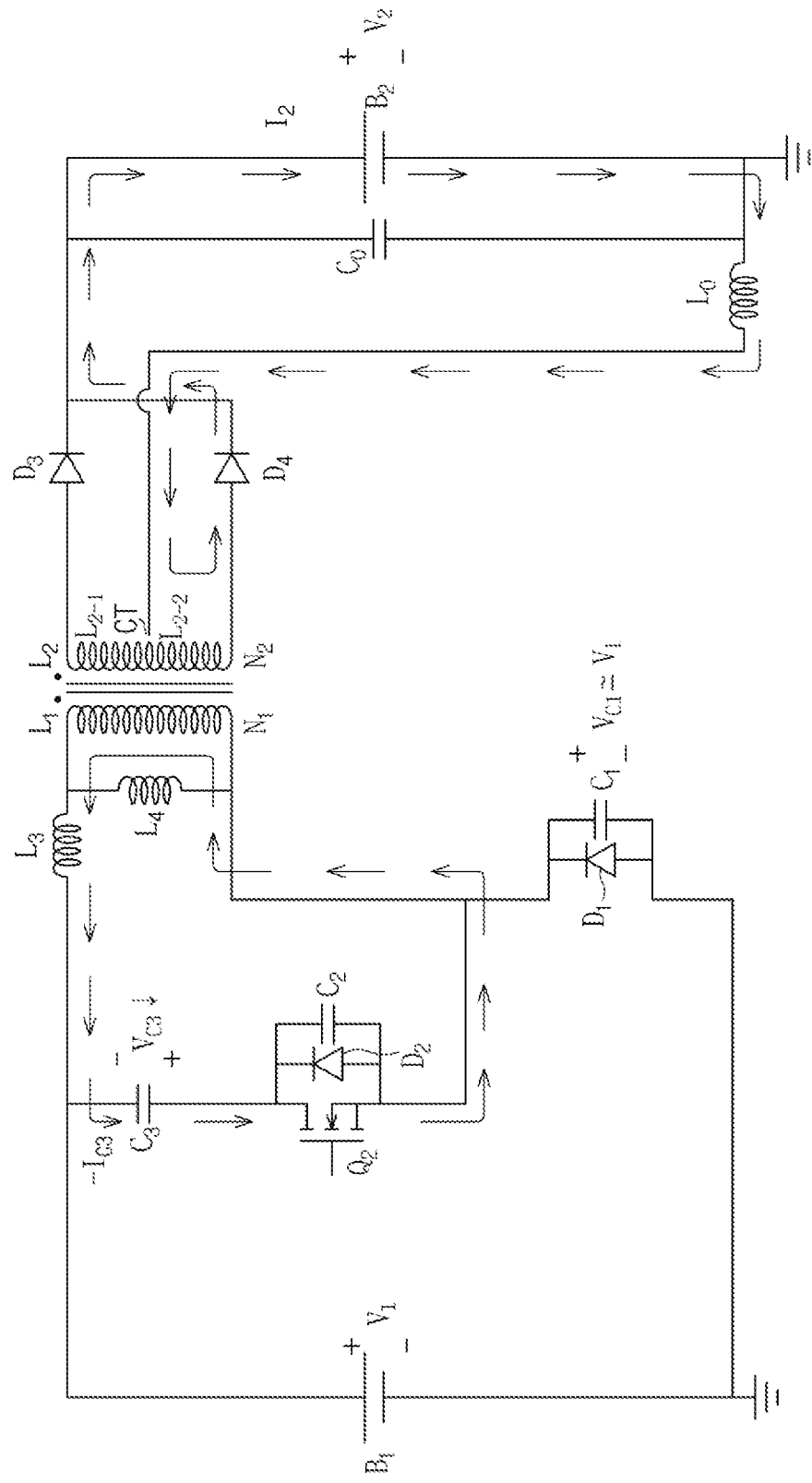
Figure 11:
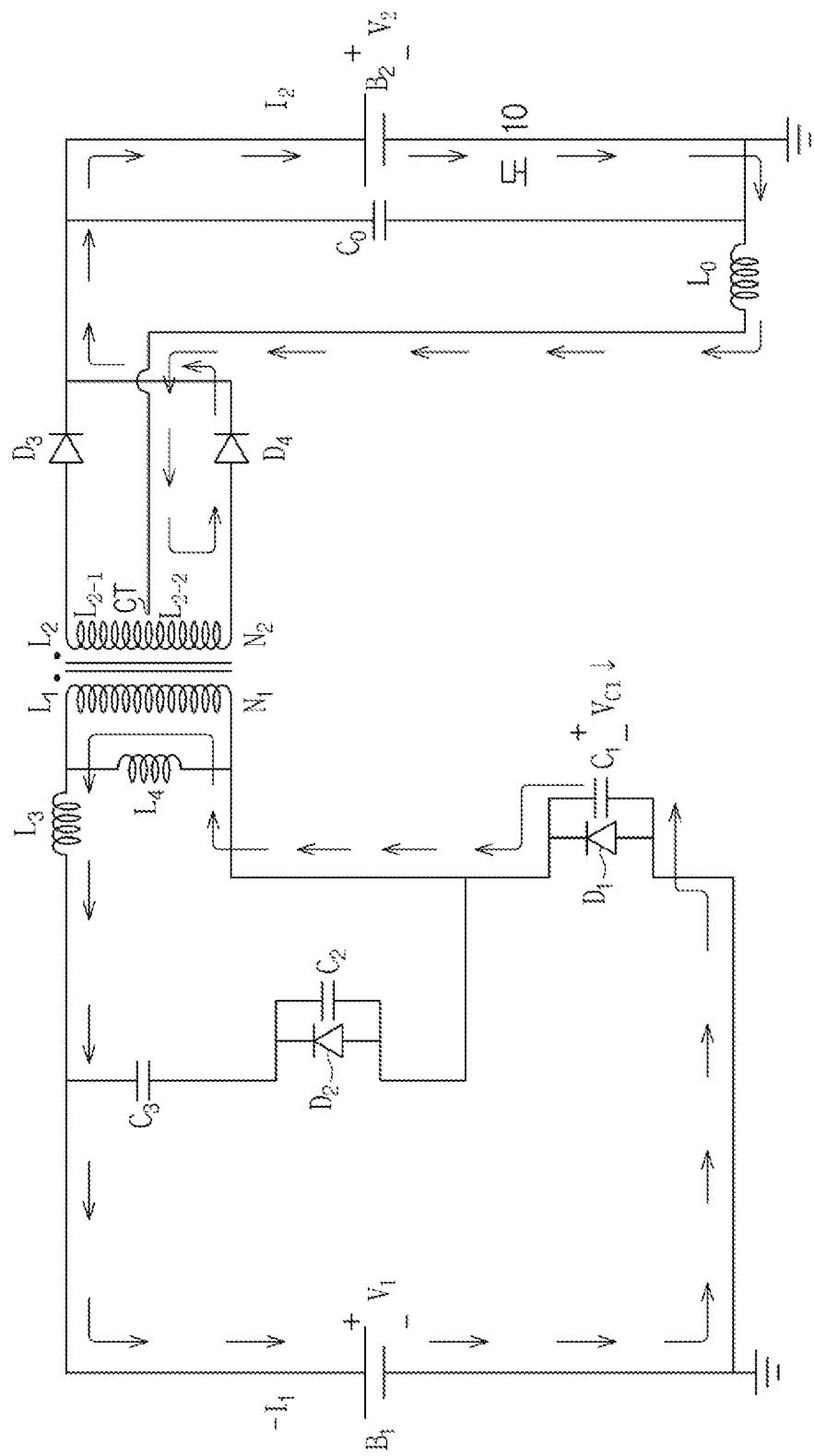

Also, if the magnetic energy stored in the leakage inductor $L_3$ and/or the magnetizing inductor $L_4$ is completely emitted, the electrical energy stored in the reset capacitor $C_3$ may be emitted to the leakage inductor $L_3$ and/or the magnetizing inductor $L_4$. As a result, as shown in FIG. 10, reverse current $-I_{C3}$ generated by the electrical energy stored in the reset capacitor $C_3$ may flow to the leakage inductor $L_3$ and/or the magnetizing inductor $L_4$ of the transformer 120 via the second switch $Q_2$.

In other words, a resonance phenomenon may occur by the leakage inductor $L_3$ and/or the magnetizing inductor $L_4$ and the reset capacitor $C_3$ to generate reverse current $-I_{C3}$, and the reverse current $-I_{C3}$ may pass through the primary coil $L_1$ of the transformer 120.

Also, due to the current $-I_{C3}$ passing through the primary coil $L_1$ of the transformer 120, current $I_2$ may be induced in the secondary coil $L_2$ of the transformer 120, and the current $I_2$ induced by the secondary coil $L_2$ may be supplied to the second battery B2 through the second rectifier diode $D_2$. As a result, the second battery B2 may be charged.

Then, the DC-DC converter 100 may open (turn off) the second switch $Q_2$, in operation 1080.

If the on time of the second switch $Q_2$ elapses after the second switch $Q_2$ is closed (turned on), the controller 110 may output a turn-off signal to the second switch $Q_2$. The second switch $Q_2$ may be opened (turned off) in response to the turn-off signal of the controller 110.

If the second switch $Q_2$ is opened (turned off), the path enabling current to flow between the transformer 120 and the reset circuit 140 may be blocked. As a result, the current $-I_{C3}$ flowing from the reset capacitor $C_3$ to the primary coil $L_1$ of the transformer 120 may be blocked.

Although the current $I_1$ is blocked, the magnetic energy stored in the primary coil $L_1$ of the transformer 120 may be emitted through the secondary coil $L_2$.

Also, the magnetic energy stored in the leakage inductor $L_3$ and/or the magnetizing inductor $L_4$ may be emitted through the first parasitic capacitor $C_1$ of the first switch $Q_1$. As described above, the magnetic energy generated by the reverse current $-I_{C3}$ may be stored in the leakage inductor $L_3$ and/or the magnetizing inductor $L_4$. In order to emit the magnetic energy generated by the reverse current $-I_{C3}$, the leakage inductor $L_3$ and/or the magnetizing inductor $L_4$ may pull current from the first parasitic capacitor $C_1$ of the first switch $Q_1$. As a result, the first parasitic capacitor $C_1$ may be discharged by the reverse current $-I_{C3}$, so that the voltage $V_{C1}$ of the first parasitic capacitor $C_1$ may drop.

In other words, a resonance phenomenon may occur by the leakage inductor $L_3$ and/or the magnetizing inductor $L_4$ and the first parasitic capacitor $C_1$, and the first parasitic capacitor $C_1$ may be discharged by the resonance phenomenon so that the voltage $V_{C1}$ of the first parasitic capacitor $C_1$ may drop.

If the first parasitic capacitor $C_1$ is completely discharged, the voltage of both terminals of the first switch $Q_1$ may become "0V". If the voltage of both terminals of the first switch $Q_1$ becomes "0V", switching loss caused by turning-on operation of the first switch $Q_1$ during the next operation cycle of the DC-DC converter 100 can be reduced.

Figure 12A:
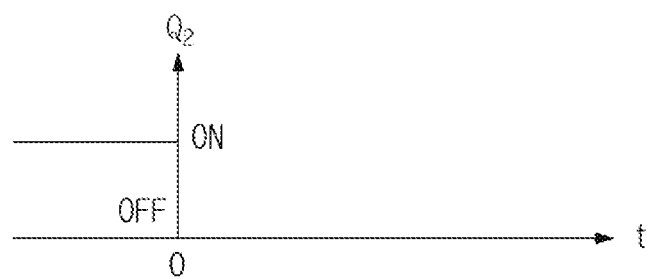
Figure 12B:
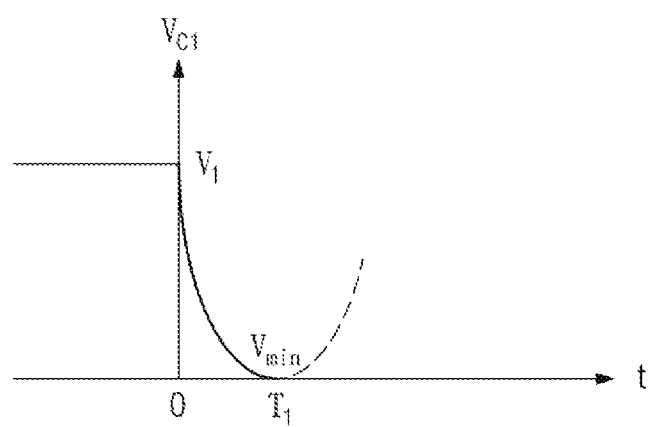
Figure 12C:
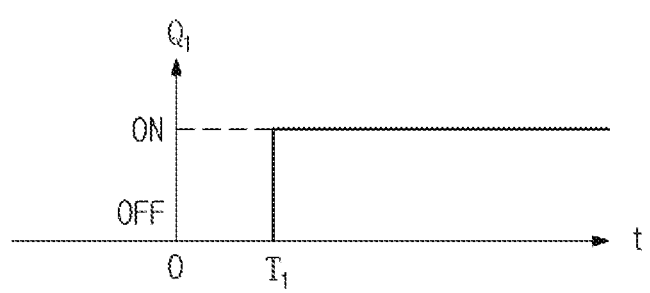

For example, if the second switch $Q_2$ is opened (turned off) at the time of 0, as shown in FIG. 12A, the voltage $V_{C1}$ of the first parasitic capacitor $C_1$ of the first switch $Q_1$ may be reduced by resonance with the leakage inductor $L_3$ and/or the magnetizing inductor $L_4$, as shown in FIG. 12B, and the voltage $V_{C1}$ of the first parasitic capacitor $C_1$ at the time of $T_1$ may become "0V". Also, as shown in FIG. 12C, the first switch $Q_1$ may be closed (turned on) at the time of $T_1$, and if the first switch $Q_1$ is closed (turned on) at the time of $T_1$, zero voltage switching may be possible, resulting in a significant reduction of switching loss of the first switch $Q_1$.

A time taken for the first parasitic capacitor $C_1$ of the first switch $Q_1$ to be discharged to the minimum value may change according to magnetic energy stored in the leakage inductor $L_3$ and/or the magnetizing inductor $L_4$ when the second switch $Q_2$ is opened (turned off). In other words, a time taken for the first parasitic capacitor $C_1$ to be discharged may change according to the magnitude of current flowing through the leakage inductor $L_3$ and/or the magnetizing inductor $L_4$ when the second switch $Q_2$ is opened (turned off).

If the current flowing through the leakage inductor $L_3$ and/or the magnetizing inductor $L_4$ is great, the voltage drop of the first parasitic capacitor $C_1$ may be great so that the first parasitic capacitor $C_1$ may be discharged quickly. Meanwhile, if the current flowing through the leakage inductor $L_3$ and/or the magnetizing inductor $L_4$ is small, the voltage drop of the first parasitic capacitor $C_1$ may be small so that the first parasitic capacitor $C_1$ may be discharged slowly. Particularly, the magnitude of current flowing through the leakage inductor $L_3$ may greatly influence the magnitude and velocity of the voltage drop of the first parasitic capacitor $C_1$.

This is due to resonance between the leakage inductor $L_3$ and the first parasitic capacitor $C_1$.

For example, in view of energy, a resonance inductor and a resonance capacitor may have correlation that can be expressed by Equation (3) below.

$$\tfrac{1}{2}L\Delta I^2 = \tfrac{1}{2}C\Delta V^2, \qquad (3)$$

where L represents the inductance of the resonance inductor, $\Delta I$ represents a changed amount of current of the inductor, C represents the capacitance of the resonance capacitor, and $\Delta V$ represents a changed amount of a voltage of the capacitor.

According to Equation (3), magnetic energy stored in the resonace inductor by resonance may be equal to electrical energy stored in the resonance capacitor, and the changed amount of the current of the resonance inductor may be proportional to the changed amount of the voltage of the resonance capacitor.

Accordingly, the magnitude and velocity of the voltage drop of the first parasitic capacitor $C_1$ may change according to the current of the leakage inductor $L_3$.

The current of the leakage inductor $L_3$ may be proportional to the magnitude of the current $I_2$ supplied to the second battery B2 by the DC-DC converter 100. Since the transformer 120 changes the magnitude of a voltage and the magnitude of current according to a ratio of the number $N_2$ of turn of the secondary coil $L_2$ with respect to the number $N_1$ of turn of the primary coil $L_1$, the current of the leakage inductor $L_3$ may be proportional to the output current of the DC-DC converter 100.

As a result, the magnitude and velocity of the voltage drop of the first parasitic capacitor $C_1$ by the leakage inductor $L_3$ may be proportional to the output current of the DC-DC converter 100. In other words, if the output current of the DC-DC converter 100 is great, the voltage drop of the first parasitic capacitor $C_1$ may be great so that the first parasitic capacitor $C_1$ may be discharged quickely. Also, if the output current of the DC-DC converter 100 is small, the voltage drop of the first parasitic capacitor $C_1$ may be small so that the first parasitic capacitor $C_1$ may be discharged slowly.

Figure 13A:
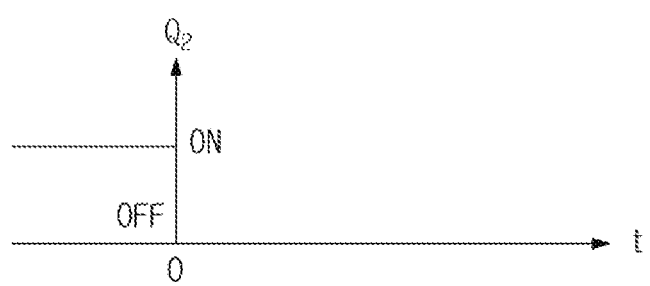
Figure 13B:
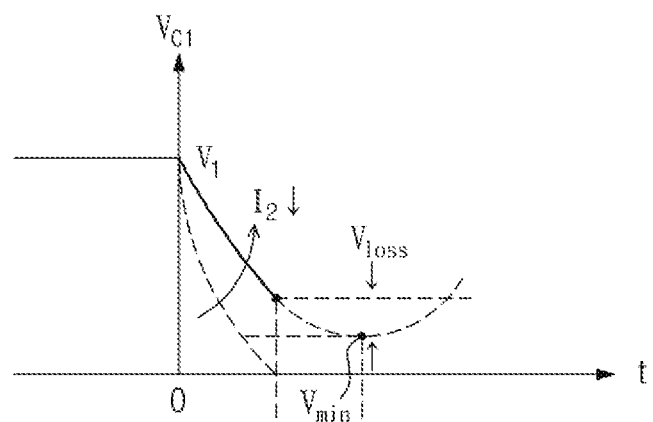

For example, if the output current of the DC-DC converter 100, that is, the second current $I_2$ is reduced, as shown in FIGS. 13A and 13B, the voltage of the first parasitic capacitor $C_1$ may drop slowly after the second switch $Q_2$ is opened (turned off) at the time of 0. In other words, if the second current $I_2$ is reduced, the magnitude and velocity of the voltage drop of the first parasitic capacitor $C_1$ may be reduced.

Figure 13C:
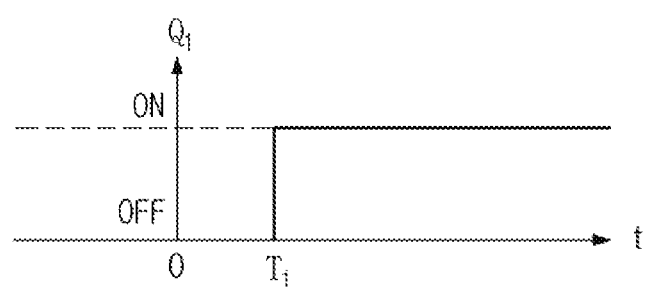

If the first switch $Q_1$ is closed (turned on) at the time of $T_1$, as described above with reference to FIG. 12, a voltage of both terminals of the first switch $Q_1$ may be not the minimum voltage $V_{min}$, as shown in FIG. 13C, so that the switching loss of the first switch $Q_1$ cannot be minimized.

In order to overcome the problem, the DC-DC converter 100 may control the turn-on time of the first switch $Q_1$ according to output current.

FIG. 14 is a flowchart illustrating another example of the operation of a DC-DC converter in one form of the present disclosure. FIG. 15 shows a lookup table used by a DC-DC converter in one form of the present disclosure to decide a dead time of a first switch. FIG. 16 shows changes in turn-on time of a first switch included in a DC-DC converter in one form of the present disclosure. Also, FIG. 17 shows the power conversion efficiency of a DC-DC converter in one form of the present disclosure.

Hereinafter, operation 1100 of the DC-DC converter 100 will be described with reference to FIGS. 14 to 17.

The DC-DC converter 100 may perform voltage drop operation 1100 at predetermined time intervals. For example, the DC-DC converter 100 may perform voltage drop operation 1100 according to a turning-on/off cycle of the first switch $Q_1$.

The DC-DC converter 100 may detect a voltage of the second battery B2, in operation 1110.

The DC-DC converter 100 may determine whether the voltage of the second battery B2 is smaller than a reference voltage of the second battery B2, in operation 1120.

If the DC-DC converter 100 determines that the voltage of the second battery B2 is not smaller than the reference voltage ("No" in operation 1120), the DC-DC converter 100 may repeatedly perform operation of detecting the voltage of the second battery B2.

If the DC-DC converter 100 determines that the voltage of the second battery B2 is smaller than the reference voltage ("Yes" in operation 1120), the DC-DC converter 100 may detect a voltage of the first battery B1, in operation 1130.

Then, the DC-DC converter 100 may decide a duty cycle of the first switch $Q_1$, in operation 1140.

Operations 1110, 1120, 1130, and 1140 may be the same as operations 1010, 1020, 1030, and 1040 shown in FIG. 6.

Then, the DC-DC converter 100 may detect output current, in operation 1150.

The output current sensor 190 of the DC-DC converter 100 may output the output current of the DC-DC converter 100, that is, an electrical signal corresponding to a value of a second current $I_2$ that is supplied to the second battery B2. Also, the controller 110 may calculate the value of the second current $I_2$ from the output signal of the output current sensor 190. For example, the output current sensor 190 may output an analog signal having a magnitude that is proportional to the value of the second current $I_2$, and the controller 110 may convert the analog signal output from the output current sensor 190 into digital data using an analog-to-digital converter.

Then, the DC-DC converter 100 may decide a dead time $T_{dead}$ of the first switch $Q_1$, in operation 1160.

The controller 110 of the DC-DC converter 100 may decide a dead time $T_{dead}$ of the first switch $Q_1$, from an input voltage (that is, the first voltage of the first battery B1) of the DC-DC converter 100 and output current (that is, the second current of the second battery B2) of the DC-DC converter 100. Herein, the dead time $T_{dead}$ of the first switch $Q_1$ may represent a time taken for the first switch $Q_1$ to be closed (turned on) after the second switch $Q_2$ is opened (turned off).

The dead time $T_{dead}$ of the first switch $Q_1$ may be decided according to a voltage drop time of the first parasitic capacitor $C_1$ caused by the resonance phenomenon between the leakage inductor $L_3$ of the transformer 120 and the first parasitic capacitor $C_1$ of the first switch $Q_1$.

Also, the voltage drop time of the first parasitic capacitor $C_1$ may depend on the current of the leakage inductor $L_3$ and the voltage of the first parasitic capacitor $C_1$. More specifically, the voltage drop time may increase as the current of the leakage inductor $L_3$ decreases, and may decrease as the current of the leakage inductor $L_3$ increases. Also, the voltage drop time may decrease as the voltage of the first parasitic capacitor $C_1$ decreases, and may increase as the voltage of the first parasitic capacitor $C_1$ increases.

The current of the leakage inductor $L_3$ may be proportional to the output current of the DC-DC converter 100, and the voltage of the first parasitic capacitor $C_1$ may be equal to the input voltage of the DC-DC converter 100.

The dead time $T_{dead}$ of the first switch $Q_1$ may be estimated by the following process:
① Deciding the minimum value of the dead time $T_{dead}$ of the first switch $Q_1$ at maximum output current, and the maximum value of the dead time $T_{dead}$ at minimum output current;
② Deciding a relation of the minimum value, the maximum value, an actual input voltage, and actual output current; and
③ Estimating a dead time $T_{dead}$ between the minimum value and the maximum value according to the actual input voltage and the actual output current.

In regard of operation ①, the minimum value of the dead time $T_{dead}$ at maximum output current of $I_{2.max}$ may be calculated from a resonance cycle of the leakage inductor $L_3$ and the first parasitic capacitor $C_1$. That is, a time taken for the voltage $V_{C1}$ of the first parasitic capacitor $C_1$ to drop to the minimum value may correspond to ¼ of the resonance cycle of the leakage inductor $L_3$ and the first parasitic capacitor $C_1$.

Accordingly, the minimum value $T_{min}$ of the dead time $T_{dead}$ of the first switch $Q_1$ at the maximum output current may be calculated by Equation (4), below.

$$T_{min} = \frac{2\pi\sqrt{L_3 C_1}}{4}, \tag{4}$$

where $T_{min}$ represents the minimum value of the dead time $T_{dead}$, $\pi$ represents the ratio of the circumference of a circle to its diameter, $L_3$ represents the leakage inductance of the transformer 120, and $C_1$ represents the parasitic capacitance of the first switch $Q_1$.

Also, when the output current I₂ is maximum, the dead time $T_{dead}$ of the first switch $Q_1$ cannot be longer than the off time of the first switch $Q_1$. If the dead time $T_{dead}$ of the first switch $Q_1$ is longer than the off time of the first switch $Q_1$, the duty cycle D of the first switch $Q_1$ may be reduced so that the DC-DC converter 100 cannot output a reference voltage to the second battery B2.

The off time of the first switch $Q_1$ may be calculated from the switching frequency $F_{SW}$ of the first switch $Q_1$ and the duty cycle D of the first switch $Q_1$, using Equation (5) below.

$$T_{max} = 1 - \frac{1}{F_{SW}} D, \quad (5)$$

where $T_{max}$ represents the maximum value of the dead time $T_{dead}$, $F_{SW}$ represents the switching frequency of the first switch $Q_1$, and D represents the duty cycle D of the first switch $Q_1$.

In regard of operation ②, when the output current of the DC-DC converter 100 is maximum, the dead time $T_{dead}$ of the first switch $Q_1$ may become a minimum value $T_{min}$, and when the output current of the DC-DC converter 100 is "0", the dead time $T_{dead}$ of the first switch $Q_1$ may become a maximum value $T_{max}$.

Also, the dead time $T_{dead}$ of the first switch $Q_1$ may decrease as the input voltage of the DC-DC converter 100 increases.

A relation satisfying the relationship may be expressed by Equation (6), below.

$$T_{dead} = T\max + (T\min - T\max) \frac{I_2/I_{2 \cdot max}}{V_1/V_{1 \cdot max}}, \quad (6)$$

where $T_{dead}$ represents the dead time $T_{dead}$ of the first switch $Q_1$, $T_{max}$ represents the maximum value of the dead time $T_{dead}$, $T_{min}$ represents the minimum value of the dead time $T_{dead}$, $V_1$ represents a measured input voltage of the DC-DC converter 100, $V_{1.max}$ represents a maximum input voltage of the DC-DC converter 100, 12 represents measured output current of the DC-DC converter 100, and $I_{2.max}$ represents maximum output current of the DC-DC converter 100.

According to Equation (6), the dead time $T_{dead}$ of the first switch $Q_1$ may decrease as the output current $I_2$ of the DC-DC converter 100 increases, and may increase as the input voltage $V_1$ of the DC-DC converter 100 increases.

Also, if the output current $I_2$ of the DC-DC converter 100 is maximum and the input voltage $V_1$ of the DC-DC converter 100 is maximum, the dead time $T_{dead}$ of the first switch $Q_1$ may become a minimum value $V_{min}$, and if the output current $I_2$ of the DC-DC converter 100 is minimum ("0"), the dead time $T_{dead}$ of the first switch $Q_1$ may become a maximum value $V_{max}$.

In regard of operation ③, the DC-DC converter 100 may decide the dead time $T_{dead}$ of the first switch $Q_1$ using Equation (6).

For example, the controller 110 of the DC-DC converter 100 may calculate the dead time $T_{dead}$ of the first switch $Q_1$, from the input voltage $V_1$ of the DC-DC converter 100 output from the first voltage sensor 170 and the output current $I_2$ of the DC-DC converter 100 output from the output current sensor 190, using Equation (6).

Particularly, the dead time $T_{dead}$ of the first switch $Q_1$ may be not smaller than the minimum value $T_{min}$. For example, although the value of the output current $I_2$ of the DC-DC converter 100 is the maximum value $I_{2.max}$, and the value of the input voltage $V_1$ of the DC-DC converter 100 is smaller than the maximum value $V_1$ max, the dead time $T_{dead}$ of the first switch $Q_1$ may be decided as the minimum value $T_{min}$.

Also, the DC-DC converter 100 may decide the dead time $T_{dead}$ of the first switch $Q_1$ using a lookup table including output current $I_2$ and input voltages $V_1$ of the DC-DC converter 100 and dead times $T_{dead}$ of the first switch $Q_1$.

For example, the memory 111 of the controller 110 may store a lookup table as shown in FIG. 15. The controller 110 may decide a dead time $T_{dead}$ of the first switch $Q_1$ corresponding to the output current $I_2$ and input voltage $V_1$ of the DC-DC converter 100 with reference to the lookup table stored in the memory 111.

Referring to FIG. 15, the dead time $T_{dead}$ of the first switch $Q_1$ may be not smaller than the minimum value $T_{min}$. For example, if the value of the output current $I_2$ of the DC-DC converter 100 is the maximum value $I_{2.max}$ and the value of the input voltage $V_1$ of the DC-DC converter 100 is 80% of the maximum value $V_{1.max}$, the dead time $T_{dead}$ of the first switch $Q_1$ may be decided as the minimum value $T_{min}$.

The DC-DC converter 100 may close (turn on) the first switch $Q_1$ after the dead time $T_{dead}$ of the first switch $Q_1$ elapses, in operation 1170.

If the dead time $T_{dead}$ of the first switch $Q_1$ elapses after the second switch $Q_2$ is opened (turned off), the controller 110 of the DC-DC converter 100 may output a turn-on signal to the first switch $Q_1$. The first switch $Q_1$ may be closed (turned on) in response to the turn-on signal of the controller 110.

For example, if the second switch $Q_2$ is opened (turned off) as shown in FIG. 16A, the DC-DC converter 100 may resume the voltage drop operation 1100, and the DC-DC converter 100 may decide a dead time $T_{dead}$ for closing (turning on) the first switch $Q_1$.

If the value of the output current $I_2$ of the DC-DC converter 100 is equal to the maximum value $I_{2.max}$ as shown in FIG. 16, the DC-DC converter 100 may decide the dead time $T_{dead}$ of the first switch $Q_1$ as a first time $T_1$ that is equal to the minimum value $T_{min}$. Also, as shown in FIG. 16C, the controller 110 may output a turn-on signal to the first switch $Q_1$ after the first time $T_1$ elapses.

If the value of the output current $I_2$ of the DC-DC converter 100 is 80% of the maximum value $I_{2.max}$, as shown in FIG. 16B, the DC-DC converter 100 may decide the dead time $T_{dead}$ of the first switch $Q_1$ as a second time $T_2$ that is longer than the first time $T_1$. Also, as shown in FIG. 16D, the controller 110 may output a turn-on signal to the first switch $Q_1$ after the second time $T_2$ elapses.

If the value of the output current $I_2$ of the DC-DC converter 100 is 60% of the maximum value $I_{2.max}$, as shown in FIG. 16B, the DC-DC converter 100 may decide the dead time $T_{dead}$ of the first switch $Q_1$ as a third time $T_3$ that is longer than the second time $T_2$. Also, as shown in FIG. 16E, the controller 110 may output a turn-on signal to the first switch $Q_1$ after the third time $T_3$ elapses.

Thereafter, the DC-DC converter 100 may open (turn off) the first switch $Q_1$, in operation 1180.

Also, the DC-DC converter 100 may close (turn on) the second switch $Q_2$, in operation 1190.

Also, the DC-DC converter 100 may open (turn off) the second switch $Q_2$, in operation 1200.

Operations 1180, 1190, and 1200 may be the same as operations 1060, 1070, and 1080 shown in FIG. 6.

As such, by changing the dead time $T_{dead}$ of the first switch $Q_1$ according to the input voltage of the DC-DC converter 100 and the output current of the DC-DC converter 100, the DC-DC converter 100 can minimize switching loss of the first switch $Q_1$. Particularly, when the output current $I_2$ of the DC-DC converter 100 is small, the switching loss of the first switch $Q_1$ can be further minimized.

Particularly, if the dead time $T_{dead}$ of the first switch $Q_1$ can change, as shown in FIG. 17, total efficiency can be improved compared to when the dead time $T_{dead}$ of the first switch $Q_1$ is fixed.

For example, if the dead time $T_{dead}$ of the first switch $Q_1$ is fixed, the efficiency of the DC-DC converter 100 may be maximum when the output current $I_2$ of the DC-DC converter 100 is about 40% of the maximum value $I_{2.max}$, and the efficiency may be reduced as the output current $I_2$ of the DC-DC converter 100 decreases. Also, when the output current $I_2$ of the DC-DC converter 100 falls below about 20% of the maximum value $I_{2.max}$, the efficiency of the DC-DC converter 100 may be reduced sharply. Particularly, when the output current $I_2$ of the DC-DC converter 100 is about 10% of the maximum value $I_{2.max}$, the efficiency of the DC-DC converter 100 may be reduced to about 83%.

Meanwhile, if the dead time $T_{dead}$ of the first switch $Q_1$ can change, the efficiency of the DC-DC converter 100 may be maximum when the output current $I_2$ of the DC-DC converter 100 is about 40% of the maximum value $I_{2.max}$, and the efficiency may be reduced as the output current $I_2$ of the DC-DC converter 100 decreases. However, although the output current $I_2$ of the DC-DC converter 100 falls below about 20% of the maximum value $I_{2.max}$, the efficiency of the DC-DC converter 100 may be reduced slowly. Particularly, although the output current $I_2$ of the DC-DC converter 100 is about 10% of the maximum value $I_{2.max}$, the efficiency of the DC-DC converter 100 can be maintained at about 89%.

Referring to FIG. 17, when the output current $I_2$ of the DC-DC converter 100 is smaller than or equal to about 20% of the maximum value $I_{2.max}$, the efficiency of the DC-DC converter 100 capable of changing the dead time $T_{dead}$ of the first switch $Q_1$ may be improved by about 5% compared to a DC-DC converter in which the dead time $T_{dead}$ of the first switch $Q_1$ is fixed.

Also, since the electric components 30 of the vehicle 1 consume a relatively small amount of power, the voltage variation of the second battery B2 may be not great. Accordingly, the output current $I_2$ of the DC-DC converter 100 may also be not great. More specifically, it is known that the output current $I_2$ of the DC-DC converter 100 is lower than or equal to 20% of the maximum value $I_{2.max}$ during 80% or more of the entire operation of the DC-DC converter 100.

Accordingly, the total efficiency of the DC-DC converter 100 capable of changing the dead time $T_{dead}$ of the first switch $Q_1$ can be improved compared to a DC-DC converter in which the dead time $T_{dead}$ of a first switch is fixed.

According to an aspect of the present disclosure, there are provided the vehicle including the DC-DC converter capable of minimizing switching loss, the DC-DC converter for vehicle, and a control method of the DC-DC converter for vehicle.

Although a few forms of the present disclosure have been shown and described, it would be appreciated by those skilled in the art that changes may be made in these forms without departing from the principles and spirit of the disclosure, the scope of which is defined in the claims and their equivalents.

Exemplary forms of the present disclosure have been described above. In the exemplary forms described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary forms, forms can thus be implemented through computer readable code/instructions in/on a medium, e.g., a computer readable medium, to control at least one processing element to implement any above described exemplary form. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary forms have been described with respect to a limited number of forms, those skilled in the art, having the benefit of this disclosure, will appreciate that other forms can be devised which do not depart from the scope of the present disclosure.

What is claimed is:

1. A vehicle comprising:
 a first battery configured to output power of a first voltage;
 a second battery configured to output power of a second voltage; and
 a DC-DC converter configured to convert the first voltage of the first battery into the second voltage, and configured to supply the power of the second voltage to the second battery,
 wherein the DC-DC converter comprises:
  a transformer configured to convert the first voltage into the second voltage;
  a first switch configured to control a first current input to the transformer from the first battery;
  a current sensor configured to measure a value of a second current output to the second battery from the transformer; and
  a controller configured to turn on/off the first switch based on a set turning-on/off frequency, wherein the controller is configured to delay turning-on or turning-off of the first switch based on the measured value of the second current.

2. The vehicle according to claim 1, wherein the controller is configured to increase a dead time for delaying turning-on of the first switch as the measured value of the second current decreases.

3. The vehicle according to claim 2, further comprising a voltage sensor configured to measure a value of the first voltage of the first battery.

4. The vehicle according to claim 3, wherein the controller is configured to decrease the dead time as the measured value of the first voltage decreases.

5. The vehicle according to claim 3, wherein the controller is configured to calculate the dead time from the measured value of the first voltage and the measured value of the second current.

6. The vehicle according to claim 3, wherein the controller is configured to acquire a dead time corresponding to the measured value of the first voltage and the measured value of the second current, from a lookup table including a plurality of values for the first voltage, a plurality of values for the second current, and a plurality of dead times corresponding to the plurality of values for the first voltage and the plurality of values for the second current.

7. The vehicle according to claim 1, wherein the DC-DC converter further comprises:
    a reset capacitor configured to reset a primary coil of the transformer; and
    a second switch configured to control reset current of the reset capacitor;
    wherein the controller turns on the second switch after the first switch is turned off, and turns on the second switch after the second switch is turned off.

8. The vehicle according to claim 7, wherein the controller is configured to turn on the first switch when a dead time elapses after the second switch is turned off.

9. The vehicle according to claim 8, wherein the controller is configured to increase the dead time as the measured value of the second current decreases.

10. The vehicle according to claim 1, wherein a voltage of both terminals of the first switch is changed by a resonance phenomenon caused by leakage inductance of the transformer and parasitic capacitance of the first switch, and wherein the controller is configured to turn on the first switch when the voltage of the both terminals of the first switch becomes a minimum value by the resonance phenomenon.

11. The vehicle according to claim 1, wherein the DC-DC converter further comprises a rectifier circuit configured to rectify a voltage and current that are output from the transformer.

12. A DC-DC converter of a vehicle for converting a first voltage output from a first battery into a second voltage output from a second battery, the DC-DC converter comprising:
    a transformer including a primary coil connected to the first battery and a secondary coil connected to the second battery, and configured to convert the first voltage into the second voltage;
    a first switch connected in series to the transformer;
    a reset capacitor connected in parallel to the primary coil;
    a second switch connected in series to the reset capacitor;
    a voltage sensor configured to measure a value of the first voltage;
    a current sensor configured to measure a value of second current output from the secondary coil; and
    a controller configured to turn on/off the first switch and the second switch based on an operating frequency,
    wherein the controller is configured to delay turning-on of the first switch based on the measured value of the first voltage and the measured value of the second current.

13. The DC-DC converter according to claim 12, wherein the controller turns on the first switch when a dead time elapses after the second switch is turned off.

14. The DC-DC converter according to claim 13, wherein the controller is configured to increase the dead time as the measured value of the second current decreases.

15. The DC-DC converter according to claim 13, wherein the controller is configured to decrease the dead time as the measured value of the first voltage decreases.

16. The DC-DC converter according to claim 13, wherein the controller is configured to calculate the dead time from the measured value of the first voltage and the measured value of the second current.

17. The DC-DC converter according to claim 13, wherein the controller is configured to acquire a dead time corresponding to the measured value of the first voltage and the measured value of the second voltage, from a lookup table including a plurality of values for the first voltage, a plurality of values for the second current, and a plurality of dead times corresponding to the plurality of values for the first voltage and the plurality of values for the second voltage.

18. The DC-DC converter according to claim 13, further comprising a rectifier circuit configured to rectify a voltage and current that are output from the transformer.

19. A method of controlling a DC-DC converter of a vehicle including a transformer configured to convert a first voltage of a first battery into a second voltage of a second battery, a first switch configured to control a first current input to the transformer, a reset capacitor configured to reset a primary coil of the transformer, and a second switch configured to control reset current of the reset capacitor, the method comprising:
    turning on the second switch to reset the primary coil of the transformer;
    turning off the second switch;
    measuring a value of second current output from a secondary coil of the transformer;
    measuring a value of the first voltage of the first battery;
    deciding a dead time for delaying turning-on of the first switch based on the measured value of the second current and the measured value of the first voltage;
    turning on the first switch after the dead time elapses; and
    turning off the first switch.

20. The method according to claim 19, wherein the dead time increases as the measured value of the second current decreases.

21. The method according to claim 19, wherein the dead time decreases as the measured value of the first voltage decreases.

22. The method according to claim 19, wherein the deciding of the dead time comprises, by a processor, calculating the dead time from the measured value of the first voltage and the measured value of the second current.

23. The method according to claim 19, wherein the deciding of the dead time comprises:
    storing a lookup table including a plurality of values for the first voltage, a plurality of values for the second current, and a plurality of dead times corresponding to the plurality of values for the first voltage and the plurality of values for the second voltage, in a memory; and acquiring a dead time corresponding to the measured value of the first voltage and the measured value of the second voltage, from the lookup table stored in the memory.

\* \* \* \* \*